United States Patent [19]

Masand et al.

[11] Patent Number: 5,251,131
[45] Date of Patent: Oct. 5, 1993

[54] CLASSIFICATION OF DATA RECORDS BY COMPARISON OF RECORDS TO A TRAINING DATABASE USING PROBABILITY WEIGHTS

[75] Inventors: Brij M. Masand, Medford; Stephen J. Smith, Lynnfield, both of Mass.

[73] Assignee: Thinking Machines Corporation, Cambridge, Mass.

[21] Appl. No.: 739,111

[22] Filed: Jul. 31, 1991

[51] Int. Cl.$^5$ .................. G06F 15/38; G01L 1/06
[52] U.S. Cl. ................................. 364/419.08
[58] Field of Search ..... 364/419, 513.5, 200 MS File; 395/600; 381/41

[56] References Cited

U.S. PATENT DOCUMENTS

| | | | |
|---|---|---|---|
| 4,814,973 | 3/1989 | Hillis | 364/200 |
| 4,823,306 | 4/1989 | Barbie et al. | 395/600 |
| 4,942,526 | 7/1990 | Okajima et al. | 364/419 |

Primary Examiner—Jr, Envall
Assistant Examiner—Frantzy Poinvil
Attorney, Agent, or Firm—Gary D. Clapp; Richard A. Jordan

[57] ABSTRACT

Classification of natural language data wherein the natural language data has an open-ended range of possible values or the data values do not have a relative order. A training database stores training records, wherein each training record includes predictor data fields. Each predictor data field containes a feature, wherein each feature is a natural language term, and a target data field containing a target value representing a classification of the record. Features may also include conjunctions of natural language terms and each feature may also be a member of a category subset of features. The training database stores, for each feature, a probability weight value representing the probability that a record will have the target value contained in the target data field if a feature contained in a corresponding predictor data field occurs in the record. Features are extracted from a new record and each feature from the new record is used to query the training records to determine the probability weights from the training records having matching features. The probability weights are accumulated for each training record to determine a comparison score representing the probability that the training record matches the new record and provide an output indicating the training records most probability matching the new record.

37 Claims, 9 Drawing Sheets

CLASSIFICATION OF DATA RECORDS BY COMPARISON OF RECORDS TO A TRAINING DATABASE USING PROBABILITY WEIGHTS

CROSS REFERENCES TO RELATED APPLICATIONS

The present patent application is related to:

U.S. Pat. No. 4,598,400, issued Jul. 1, 1986, to W. Daniel Hillis, for Method and Apparatus for Routing Message Packets, and assigned to the assignee of the present application, incorporated herein by reference;

U.S. Pat. No. 4,814,973, issued Mar. 21, 1989, to W. Daniel Hillis, for Parallel Processor, and assigned to the assignee of the present application, incorporated herein by reference;

U.S. Pat. No. 4,709,327, issued Nov. 24, 1987, to W. Daniel Hillis, for Parallel Processor/Memory Circuit, and assigned to the assignee of the present application, incorporated herein by reference;

U.S. patent application Ser. No. 07/043,126, now U.S. Pat. No. 4,984,325 filed Apr. 27, 1987, by W. Daniel Hillis, et al, for Method and Apparatus for Routing Message Packets, and assigned to the assignee of the present application, incorporated herein by reference; and, U.S. patent application Ser. No. 07/639,490, now U.S. Pat. No. 5,131,054 filed Jan. 9, 1991, by Stephen Smith, for Character Recognition System Using Massively Parallel Computer, and assigned to the assignee of the present application, incorporated herein by reference.

FIELD OF THE INVENTION

The present invention relates generally to data parallel systems for reaching conclusions or decisions regarding new sets of data by comparing the new data to historic data and, more particularly, to such systems for classifying data which is not well behaved, having an open-ended or non-comparable set of values for each data sample.

BACKGROUND OF THE INVENTION

A recurring problem in the computer field is the implementation of computer systems which may substitute for often scarce human workers, in particular workers having particular knowledge and skills or expertise, ranging from well trained and experienced clerical workers to highly skilled professionals, such as medical experts. The essential problem is to implement the knowledge and skills of the human expert into a computer system in such a manner that the computer system, when provided with the same fact pattern as the human expert, will reach the same conclusion or decision as the expert.

The first implementations of such systems used conventional, sequential computers characterized in that such systems are data sequential, that is, they perform a sequence of operations on a very limited number of data elements at a time, such as an add or compare of two data elements. A sequential system which was to work with extremely large numbers of data elements would thereby require prohibitively long computation times, even for very fast systems.

In order to reduce the number of data items to be dealt with, the first forms of "expert" systems thereby implemented human "expertise" as rule based systems wherein "knowledge engineers" would attempt to elicit from the experts a set of rules by which the experts reached decisions given a fact pattern. Such a set of "rules" would attempt to codify, for example, the knowledge, methodology and reasoning process used by a medical diagnostician to reach a diagnosis given a set of symptoms, the results of medical tests, and so on. The "rules" would then be programmed as a sequence of decision steps and, given a fact pattern, the system would execute the programmed sequence of rule decisions to reach the same conclusion as the expert.

Rule based "expert" systems, however, require a very substantial investment of knowledge engineer and expert time, and programmer time, in determining the appropriate set of rules and encoding those rules. For example, a rule based system for performing the census return classification operations used as an illustration in describing the present invention required four person-years to construct. Also, much expertise is based upon knowledge of a very large number of individual fact patterns and the codification of this expertise into a set of rules, which are of necessity and purpose more general than individual cases, results in the loss of much information. For example, a medical diagnostician may recognize a second case of legionnaire's disease after learning of only a single previous case. A rule based system generally will not since a single case is not sufficient to require rewriting the rules of the system to accommodate the new case; the rewriting of the rules in a rule based system is an extremely difficult and time consuming task because the rules interact, and a change in one rule typically requires corresponding chages in many related rules. In addition, it is very difficult to determine whether the correct set of rules have been implemented; many experts do not consciously know and understand their own methodology and reasoning processes and may unconsciously create "rules" that do not in fact reflect their methodology. Lastly, it is very difficult to change a rule based system once it has been designed and implemented.

The development of data parallel systems has lead to the development of memory based reasoning systems to perform functions analogous to rule based systems, but very different in actual implementation and operation. Data parallel systems exploit the computational parallelism of many data intensive operations by performing single operations on thousands of data elements in parallel and are comprised of a single instruction engine controlling a very large number of data processing units, with one processor unit being associated with each data element to be operated upon.

Memory based reasoning systems differ from rule based systems by operating directly from historic data to reach a conclusion or decision with regand to a new fact pattern by directly comparing the new data to the historic data and the decisions or conclusions reached for each of the previous sets of data. Such systems include a training database comprised of historic records, wherein each record contains a set of related data fields containing data values, that is, information, relating to a previous fact pattern. The data fields in a given record of the training data base are in turn comprised of a number of "predictor" data fields, containing the originally known information pertaining to the previous fact patterns, and one or more "target" data fields containing the results, conclusions or decisions reached from the originally known information. It should be noted that the "data values" appearing in the data fields may be comprised of numeric data or text or both, depending on the particular database.

A new record is similarly comprised of predictor data fields and target data fields but, while the new record predictor data fields contain data, the contents of the new record target data fields is determined by comparison of the new record predictor fields with the historic record predictor fields. To illustrate by reference to the previous example, a medical database will contain historical patient records wherein the predictor data fields contain information such as symptoms, test results and patient characteristics and the target data fields contain the diagnosis and treatment plan for each patient. A new patient record will contain information in the predictor data fields, but the diagnosis and treatment plans for the new patient will be determined by comparison of the new patient record predicator data fields with the historic patient record predictor data fields. It should be noted that it is possible to make an identification in a new case from a single previous case because all of the data in each of the historic patient records is retained in the database, rather than being abstracted into rules with consequent loss of the data particular to individual cases.

In general, memory based reasoning systems of the prior art determine the contents of the target fields of a new record, that is, the values to appear in the target fields, by first identifying the predictor data fields of the training database which are more relevant or significant in determining the target data field values and assigning "weights" to the predictor fields according to their relative significance in performing the determination. This step is generally performed by determining, for each target field and each predictor field in the training database, the probability that a given target field will have a specified value given that a predictor field has a given value.

This general approach to determining the probabilities that a target field has a specified value given that a predictor field has a given value is based upon the assumption that all occurrences of that predictor field in the training database have the same data value, which is rarely the case. Because of this, the "probability" for each predictor field is modified according to the differences, or "distances", between the values of each predictor data field which may be used to predict the value of a given target field. The distances between predictor field values are determined over the range of possible values for the predictor field and used to generate a difference measurement. The probability assigned a predictor field is then modified by the predictor field's difference measurement to determine the final "weight" assigned to the predictor field. Because these "weights" are based upon the distances between field values, these weights will hereafter be referred to as "distance weights". It should be noted that a high "distance weight" corresponds to a small "distance" between field values, that is, the field values are near one another and that these weights are assigned to the predicator fields themselves, and not the values in the fields.

It is apparent that the various predictor fields will differ greatly in their importance in determining target field values and it is further noted that the predictor fields often do not operate independently in constraining the values appearing in the target fields, that is, the combined effect of two predictor fields is often quite different than their individual effects. Accordingly, the relative distance weights assigned to the predictor data fields are used to select, or limit, the training database predictor data fields which will actually be used in comparison with the data fields of the new sample, thereby restricting the training database to a subset of the fields in the training database.

The predictor data field values of a new sample are then identified and compared to the selected predictor data fields of the examples in the training database. The matches between new sample data field values and the corresponding values of the selected training database data fields are identified and their distance weights are accumulated according to a "metric", or measure. The values appearing in the target data fields of the nearest matching training database record, as determined by the metric, are then used as the contents of the target data fields of the new sample.

It is apparent from the above discussion that the memory based reasoning systems of the prior art depend upon determinations of the relative "distances", between the data in the fields in each step of the above described process, such as "57" is closer to "100" than to "3", or "violet" is closer to "red" than to "green". In an exact match system, the required "distance" is, of course, zero.

This in turn requires that the data values be well behaved. That is, there must be a defined set or range of possible values for the data, the data values must inherently have some relative order or ranking, and the data values must be comparable across at least the fields which are to be compared to one another.

Conversely, memory based reasoning systems of the prior art are not suitable for use with data which is not well behaved, that is, where there is an open-ended range of possible values for each data field or where the possible data values do not have some relative order or ranking and, consequently, where the data contained in the various fields of a database are not comparable across the fields. The most common example of such data is information expressed in "natural language" terms, also referred to as "free text", wherein there are a very large number of possible ways in which to express the information. Certain databases, such as the census return database discussed herein as an example of an implementation of the present invention, may contain up to 50,000 or more different words.

Because of the very large number of possible ways in which the same data may be expressed in "natural language", the likelihood of finding a match between the natural language data fields of a new sample and the natural language data fields of the training database, or even a match between the data fields of the training database, are much reduced. This factor alone significantly reduces the ability of the memory based reasoning systems of the prior art to deal with natural language data.

For the same reason, the natural language data contained in the various fields of the training database and the new samples are not comparable across the fields, so that it is very difficult, if possible at all, to compare the fields of the training database with one another or with the fields of a new example, that is, to determine the "distance" and accordingly the "distance weights" between any training database example and a new sample. To illustrate by reference to the example which will be used below to illustrate the present invention, the free text data that may appear in a given single word data field of the industry description fields of different census returns may include the words "car", "big", "retail", and "factory". It is apparent that there is no order or ranking that can be placed on these examples that would aid in classification of the terms, nor is the "distance" between these terms ascertainable, that is, for example, it cannot be determined whether "big" is closer to "retail" than to "factory", or whether "retail" or "factory" is closer to "car". In further example, a census return text field may contain the response "The Computer Industry" and two examples in the training database may contain the responses "A Computer Business" and "The Automobile Industry". Based upon a distance comparison of these three text fields, "The Automobile Industry" is closer to "The Computer Industry", with a match between two words, than is "A Computer Business", which provides a match for only one word.

The above example also illustrates that the relative significance of predictor data fields per se in determining matches between training database examples and a new sample is significantly reduced in the case of natural language data. That is, it is difficult to assign a predictive distance weight to a predictor data field in itself based upon the probability of a target field having a certain value given that a predictor field has a given value because the range of values that may appear in that predictor data field is open ended. Similarly, a distance weight based upon the "difference" between the values of two fields is meaningless when the values contained in the two fields are not comparable. In the example used just above, a single predictor data field may, in four different returns, contain the values "car", "big", "retail", and "factory" and this single data field may more accurately be represented as four different data fields.

It should be noted that data in the form of text does not necessarily comprise "natural language" data, or "free text". Referring to the previous example of a medical database, much of the data fields therein will contain text. If the database records are constructed by medically trained personnel, however, the terms used will be drawn from a limited vocabulary of well defined technical medical terms. That is, the textual data will not be open-ended as to the values appearing therein, the terms will have certain well-defined values and an order or ranking relative to one another across corresponding data fields, and the data will be comparable across the fields. If, however, certain of the data fields were provided by the patients, for example, in responding to a medical questionnaire, those data fields would contain "natural language" text as a patient would not normally use well defined technical medical terms and two patients would not necessary express their symptoms in the same way, even if the symptoms were in fact identical.

Conversely, and although the terms natural language data or free text will be used herein for convenience, it is to be understood that other forms of data exhibit the same characteristics as free text and that the present invention applies equally to other forms of data wherein there is an open-ended range of possible values for the data or the data values are not ordered or comparable across the data fields.

The present invention provides a solution to these and other problems of the prior art memory based reasoning systems.

SUMMARY OF THE INVENTION

The present invention provides a system for classifying natural language data wherein the natural language data is contained in new records, each such record including a plurality of predictor data fields containing data expressed in natural language values, wherein natural language data is characterized by data values having an open-ended range of possible values, or wherein the natural language data values do not have a relative order.

The system includes a training database for storing a plurality of training records, wherein each training record includes a plurality of predictor data fields, each predictor data field containing a feature, wherein each feature is a natural language term, and a target data field containing a target value representing a classification of the record. Features may also comprise conjunctions of natural language terms and, in a present embodiment of the system, features comprise words and conjunctions of pairs of words. Each feature may also be a member of one of a plurality of category subsets of features, and a feature appearing in identical form a multiplicity of the category subsets comprises a corresponding multiplicity of separate and distinct features.

The training database further includes a probability weight means for storing, for each feature, a probability weight value representing the probability that a record will have the target value contained in the target data field if a feature contained in a corresponding predictor data field occurs in the record, and query means for extracting the features from a new record and querying the training records with each feature extracted from the new record. The query means is responsive to a match between a feature extracted from the new record and a feature stored in a training record for providing the probability weight corresponding to the feature. The system also includes a metric means for receiving the probability weights from the query means and accumulating, for each training record, a comparison score representing the probability that the training record matches the new record and providing an output indicating the training record most probability matching the new record, the target field value of the indicated training record then being selected as the target value of the new record.

Each probability weight value may be a per-target value weight representing, for a corresponding single combination of a feature and a target field value, the conditional probability that the target field will have the target field value when that the feature occurs among the features of the record containing the target field value. In this case, the probability weight means may include for each feature in each training record, a corresponding probability weight field associated with the predictor data field containing the feature, each probability weight field containing the per-target probability weight value for the feature contained in the associated predictor data field.

Each probability weight value may also or alternately be a cross-target value weight representing, for a given corresponding feature, the relative conditional probability that the corresponding feature is of significance in determining target field values across all target field values of the training records. In this instance, the probability weight means may include, for each feature, a probability weight field for containing the cross-target probability weight value for the feature.

In present embodiments of the invention, the accumulated comparison score for each training record may be the sum of the probability weights of the features in the new record which match features in the training record, or the highest probability weight of all the probability weights of all features in the new record that match features in the training record, or the cumulative probability of error in predicting the target value of the new record target field over all features of the new record which matched features of the training record. The metric means may also comprise a means for selecting the k training records having the highest cumulative comparison scores, without regard to the target field values of the selected training records, aggregating the selected training records by their target field values, and selecting the target field value of the training records having the highest aggregate as the target field value for the new record. The metric means may further include a means for comparing the cumulative comparison score of the training record selected to provide the target field value for the new record to a predetermined threshold score and rejecting the selection of the training record target field value when the cumulative comparison score of the training record does not meet the predetermined threshold score.

In a presently preferred embodiment of the invention, the system is a data parallel system comprising a plurality of processing elements, each processing element including a memory for storing data to be operated on by the processing element, and an associated processor for performing operations on the data residing in the associated memory, and control means for issuing instructions for directing operations of the system, wherein each processor is responsive to the instructions for performing the operations in parallel on the data stored in the associated memory. The means for storing a plurality of training records comprises a corresponding plurality of processes, each process residing in a memory of a processor element. The query means comprises the control means for extracting the features from a new record and transmitting the features to the processors of the processing elements and the processors of the processing elements for reading the features from the training records stored in each associated record, the processors being responsive to a match between a feature extracted from the new record and a feature stored in a training record for reading the probability weight corresponding to the feature. The metric means comprises the processors of the processing elements for receiving the probability weights, wherein each processor is responsive to instructions from the control means for accumulating for each training record stored in the associated memory the comparison score representing the probability that the training record matches the new record, providing an output indicating the training record most probability matching the new record, and selecting the target field value of the indicated training record as the target value of the new record.

The present invention further includes, in yet further embodiments, means for generating the training database.

It is therefore an object of the present invention to provide a system for classification of records containing natural language data.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PREFERRED EMBODIMENT

As will be described in further detail below, data parallel systems exploit the computational parallelism of many data intensive operations by performing single operations on thousands of data elements in parallel. It is this characteristic of data parallel systems which is particularly suited for implementing the invention described herein.

A data parallel system as described herein is comprised of a single instruction engine, which performs all control functions of the system, and a very large number of data processing units, for example, $2^{16}$ processing units, and associates one processor unit with each data element to be operated upon. Each data processing unit has an associated memory for storing the single data element associated with the data processing unit and any information associated with the data element. The data processing units are interconnected through a communications network through which the data processing units may exchange data.

Figure 2:
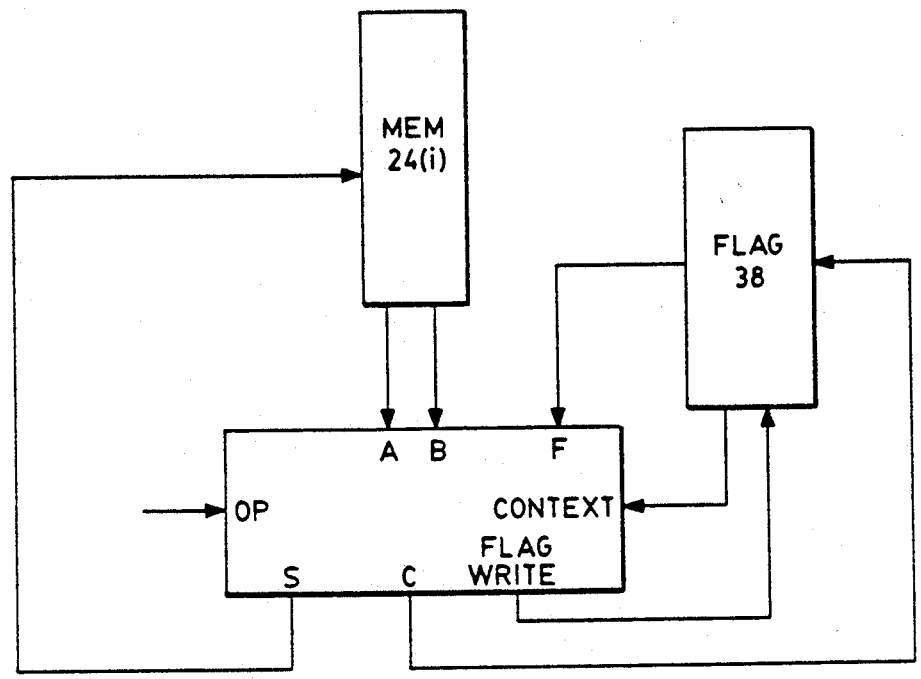
FIG. 2 is a block diagram of a processor of the system of FIG. 1.
Figure 3:
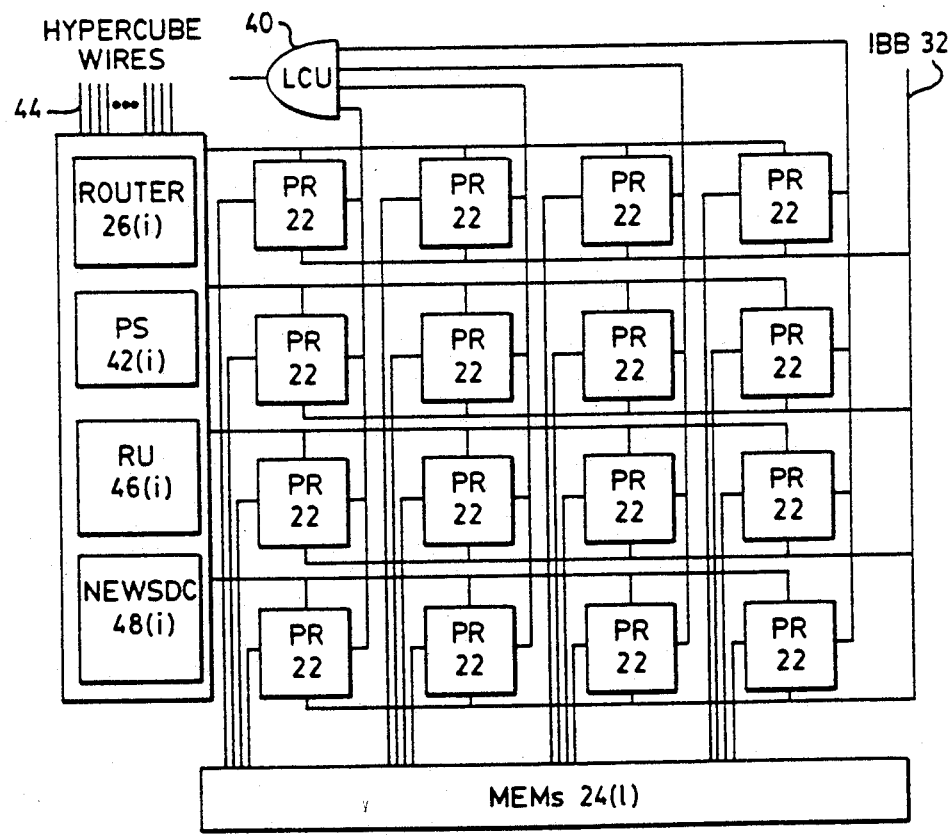
FIG. 3 is a block diagram of a node of the system of FIG. 1.

A. Description of A Data Parallel System (FIGS. 1, 2 and 3)

Figure 1:
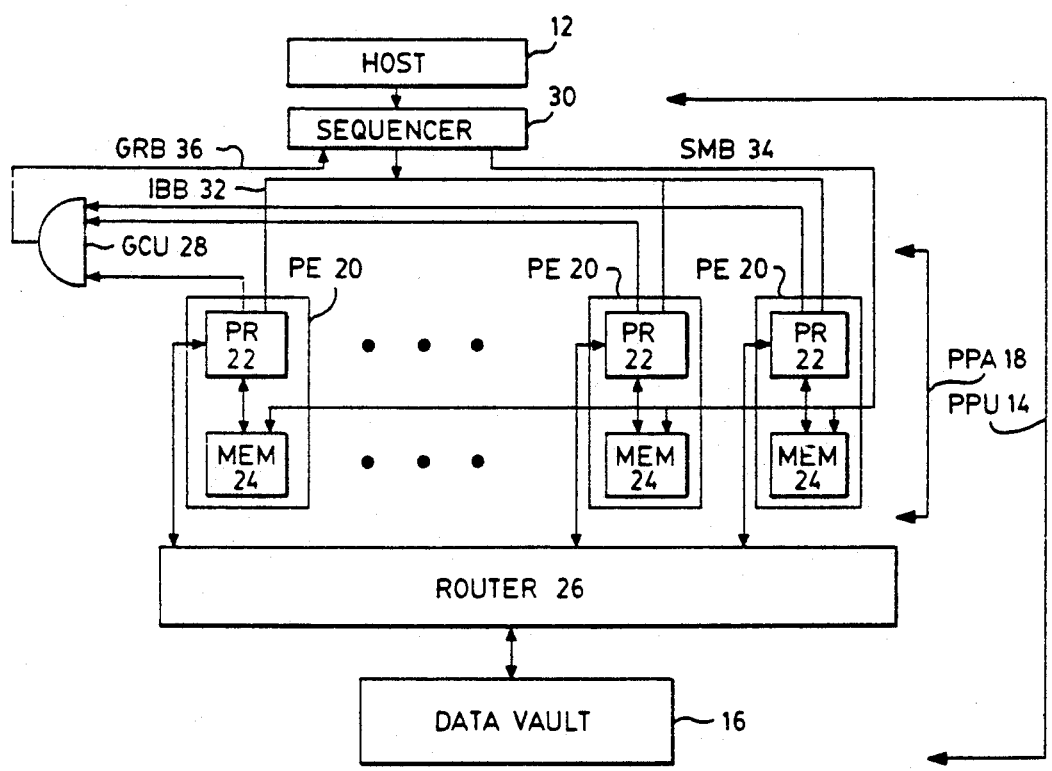
FIG. 1 is a block diagram of a data parallel system in which the present invention may be implemented.

FIG. 1 is a block diagram of a massively data parallel System 10 in which the present invention is implemented. System 10 may be, for example, a Connection Machine[1] Model CM-2[2] from Thinking Machines Corporation of Cambridge, Mass. As shown in FIG. 1, the principle units of System 10 are a Host Computer (HOST) 12, a Parallel Processing Unit (PPU) 14, and a mass data storage unit, Data Vault (DV) 14. HOST 12 provides a user interface to System 10, for example, through a keyboard and mouse and standard CRT display, directs the overall operation of System 10, executes those portions of a data processing program which are best executed sequentially, and provides data to and receives the results of operations from PPU 14. HOST 12 is typically a conventional sequential computer, such as a Digital Equipment Corporation microVAX[3] or Sun Microsystems, Inc. Sun-4[4] workstation.

[1]Connection Machine is a registered trademark of Thinking Machines Corporation.
[2]CM-2 and CM are trademarks of Thinking Machines Corporation.
[3]microVAX and VAX are trademarks of Digital Equipment Corporation.

[4] Sun and Sun-4 are trademarks of Sun Microsystems, Inc.

1. Parallel Processing Unit 14, Front End Computer 12 and Data Vault 16 (FIG. 1)

PPU 14 performs all data processing operations which can be performed simultaneously on many data elements. As represented, PPU 14 includes a Parallel Processor Array (PPA) 18, which is comprised of a number of Processor Elements 20A through 20n, a Processor Element (PE) 20 being generally referred to as PE 20(i). Each PE 20(i) in turn includes a Processor (PR) 22(i) and an associated Memory (MEM) 24(i). PEs 20(i) are interconnected through an interprocessor communications network through which PEs 20(i) may exchange data among themselves and transfer data to and from DV 16. This communications network is generally designated in FIG. 1 as Router 26, and will be discussed further below.

As was described, all operations of System 10 are controlled through programs executing on HOST 12. Parallel data processing instructions issued by HOST 12 are received by a Sequencer 30, which is a microprogram control engine which issues corresponding microinstructions to all PRs 20(i) in parallel through Instruction Broadcast Bus (IBB) 32, so that all of the PRs 20(i) execute the same operations in parallel. Because all operations of PPU 14 are controlled by HOST 12 and Sequencer 30, the processing elements of PPA 18 are not required to process instructions or addresses and may be optimized for the processing of data elements. In this regard, read/write addresses for MEMs 24 are transmitted to the MEMs 24 by Sequencer 30 together with the microinstructions controlling read/write operations.

HOST 12 exchanges data with PPA 18 through three mechanisms referred to as the scalar memory bus, broadcasting, and global combining. As shown, HOST 12 is connected to MEMs 24(i) through Sequencer 30 and a Scalar Memory Bus (SMB) 34, which allows HOST 12 to read and write access MEMs 24(i). In a scalar memory bus operation, Sequencer 30 may read or write one data word at a time from or to a single MEM 24(i) by issuing read/write commands and addresses through IBB 32 while transferring the data word through SMB 34. In a broadcast, Sequencer 30 again communicates with MEMs 24(i) through SMB 34, but writes one value, for example, a data element, an address, or a flag, to all MEMs 24(i) in parallel by issuing a parallel write microinstruction sequence and address to all PEs 20 through IBB 32.

Global combining is the means by which HOST 12 receives data from PPA 18. As shown, The outputs of PEs 20(i) are connected to a Global Combine Unit (GCU) 28, which allows System 10 to perform certain operations with respect to one selected value from each of the PEs 20(i), such as obtaining the sum of the values, the largest value, or a logical OR of the values. HOST 12 is in turn connected from the output of GCU 28 through a Global Result Bus (GRB) 36 and Sequencer 30 to receive the results of parallel data processing operations from PPU 14.

Referring finally to DV 16, PPU 14 operates with variable length data elements, as discussed further below, but data is exchanged between PPU 14 and DV 16 as fixed length data words with appended Error Correcting Code (ERCC) bits. DV 16 is a parallel array of disk drives, with one drive for each data or ERCC bit, and each data word with its associated EROC bits is spread across the parallel array of disk drives, with one data bit or ERCC bit of each data word being stored in a corresponding one of the disk drives. A complete data word with its associated ERCC bits is thereby transferred between DV 16 and PPU 14 on each clock cycle. It should be noted that DV 16 is usually connected to Router 26 through an Input/Output Controller, which for simplicity is not shown individually in FIG. 1. Other input/output channels to other devices, such disk drives, communications networks, displays and other systems, such as HOST 12, may similarly be connected into PPA 18 through Router 26 and appropriate Input-/Output Controllers to permit data exchange between PPA 18, DV 16 and such other devices.

2. Processor Element 20 (FIG. 2)

Having described the overall structure and operation of a System 10 with reference to FIG. 1, FIG. 2 is a block diagram of an exemplary a single PE 20(i) with its PR 22(i) and associated MEM 24(i). As shown, each PR 22(i) in the present embodiment of System 10 is a bit serial processor, performing all operations sequentially, one bit at a time. A PR 22(i) has two single bit data inputs (A,B) connected from the associated MEM 24(i), a control input (OP) from IBB 32, a single bit Flag input (F), which may also receive the carry bit from a previous bit operation, a single bit Context input which, as described below, controls certain aspects of the PR 22(i) operation, and single bit Sum (S), Carry (C) and Flag Write outputs.

The MEM 24(i) associated with each PR 22(i) is a single bit wide by m bits long memory where m may be, for example, 256K bits. As described, System 10 operates with variable length data elements and each MEM 24(i) is thereby not organized as a series of fixed length memory locations and the space in a MEM 24(i) allocated to a given data element is determined by the length of the data element.

MEMs 24(i) may typically be physically constructed as a n bit wide by m bit long memory, where n is the number of PRs 22(i) in System 10 and m is the length of the MEM 24(i) associated with each PR 22(i), and the single bit wide input and output of each one bit wide slice of the memory will be associated with and connected to a single PR 22(i). However, and because each MEM 24(i) is permanently associated with a given PR 22(i), each MEM 24(i) may be regarded as functioning as a processor dedicated register, rather than as a conventional memory as found in sequential machines.

Also associated with each PR 22(i) is a Flag Register (Flag) 38 which is used, for example, to store the output of one single bit operation, such as an add carry or the result of a compare operation to be used in a subsequent operation or subsequently sent to another PR 22(i) or GCU 28.

Flag 38 is also used to store single bit flags which are provided to the CONTEXT input of the PR 22(i) to control the operation of the PR 22(i). In particular, and as was described, all instructions are broadcast in parallel to all PRs 22(i) of PPA 18 and all the PRs 22(i) may perform the indicated operation in parallel. The context flag, however, may be used to effectively prevent a given PR 22(i) or selected set or array of PRs 22(i) from performing a given operation. When the Context flag input to a PR 22(i) has a given value, the PR 22(i) will perform the indicated operation, but is prevented from writing the result of the operation into either the associated MEM 24(i) or the associated Flag 38 so that, in effect, the operation has not taken place.

This feature allows System 10 to select certain data elements to be operated upon, while excluding other data elements. For example, Sequencer 30 may instruct the PRs 22(i) to read a given data element from their associated MEMs 24(i) and to set their Context Flags to a given value dependent upon the value of the data element, thereby selecting the PRs 22(i) having or not having that value to take part in or be excluded from one or more subsequent operations.

To illustrate, assume that a large medical database is comprised of patient records, with each record containing data fields containing data elements such as symptoms, diagnosis and treatment plans. Assume also that the record of a new, undiagnosed patient is to be compared to the database to find the records having symptom data elements most closely matching those of the undiagnosed patient and thereby to find the most probable diagnosis for the new patient. The data fields from the database are stored in the MEMs 24(i), one data element to each PR 22(i), and preferably as a regular array with, for example, each column of the array containing all data fields of a given record and each row containing corresponding data fields from the records. If, for example, there is reason to believe that the diagnosis is gender dependent and that it is desirable to eliminate from consideration all patients who were women, Sequencer 30 could either instruct all PRs 22(i) to compare the values of their data elements to "gender=female" or instruct the PRs 22(i) of the row containing the gender data fields to compare their data field contents to "gender=female". These comparisons would be performed by the PRs 22(i) in parallel and the records of female patients would thereby be identified in a single operation, being any array column having a PR 22(i) containing a positive result from the comparison. Sequencer 30 would then set the Context Flags of all PRs 22(i) in each column containing a positive gender comparison result to exclude the records in those colums from subsequent operations. Sequencer 30 may set the Context Flags directly or, for example, by transmitting the positive comparison result through the Interprocessor Communication Network to the Context Flag registers of the PRs 22(i) in that column.

Finally, the number of data elements that may be stored in and operated upon at any time is not limited to the number of physical PEs 20(i). The effective number of PEs 20(i) may be multiplied by means of a process referred to as "virtual processors" in which each MEM 24(i) may be subdivided with each subdivision being dedicated to storing a given data element and its associated processing context, such as flags. The data element and context stored in each such subdivision of a MEM 24(i) is referred to as a "virtual process" or "virtual processor" and becomes a "real" process or processor when the associated PR 22(i) accesses and performs operations on that data element and associated context. Each virtual process residing in the MEM 24(i) of a given PE 20(i) is, together with the PE 20(i), referred to as a "virtual processor". In the event that System 10 is operating in the virtual process mode, each PE 20(i) will respond to each instruction from Sequencer 30 by executing the indicated operation in turn on each virtual process resident in the PE 20(i). In the following discussions, the term "process" or "processor" will be understood to means both "real" and "virtual" processes and processors.

3. Interprocessor Communications Network (FIG. 3)

Referring now to the interprocessor communications network which was generally represented in FIG. 1 as Router 26, the PR 22(i)s of PPU 14 are organized into "nodes" and the nodes organized into a boolean n-cube, referred to as a "hypercube". Each node contains a plurality of PR 22(i)s and the communications network provides both general and specialized parallel communication between the PR 22(i)s and defines the hypercube structure of the nodes.

The communications network of PPU 14 is described at the node level with the aid of FIG. 3. In the presently preferred embodiment of System 10, each node contains 16 PRs 22(i) organized as a 4×4 array. As was described in the previous discussion of PRs 22(i), the control input of each PR 22(i) of a node is connected from Instruction Broadcast Bus (IBB) 32 and the data inputs and outputs of each PR 22(i) is connected to the corresponding MEM 24(i). The outputs of the PRs 22(i) of the node are connected to the inputs of a Local Combine Unit (ICU) 40, whose output is in turn connected to an input of GCU 28. ICU 40 performs operations similar to those of GCU 28, but with respect to only the 16 PRs 22(i) within the node. The data connections from SMB 34 to MEMs 24 and from DV 16 to MEMs 24 through Router 26(i) and the address connection from IBB 32 to MEMs 24 are also represented in FIG. 3.

The outputs of the node's PRs 22(i) are also connected to the input of a Router 26(i), which is a node resident portion of the Router 26 shown generally in FIG. 1. As described below, the Router 26(i)s of the nodes are interconnected to comprise the hypercube interprocessor communications network.

First considering interprocessor communications within a node, as was described each PR 22(i) may contain a plurality of virtual processes. Communication between the virtual processes resident in a single PR 22(i) are accomplished within the PR 22(i) by read and write operations, under control of Sequencer 30, between the areas of the corresponding MEM 24(i) containing the virtual processes.

Communications between PR 22(i)s is provided by a Permutation Switch (PS) 42(i), which is functionally independent of the other communications circuits of Router 26(i) and which provides direct connections between any pairs of the PRs 22(i) in the node.

Next considering the internode communications capabilities of Router 26, the hypercube structure of the communications network may be illustrated by an example. A three dimensional hypercube network may be represented by a three dimensional cube, wherein each corner of the cube represents a node of the network and the edges of the cube the links between nodes provided by the communications network. It is apparent that any given node (corner) will have direct connections (edges) to three other adjacent nodes and that a message from one node may reach any other node by traversing no more than three communications links (edges). A four dimensional hypercube may be represented by two three dimensional cubes with each corner (node) of one cube being connected to the single corresponding corner of the other cube by an additional edge (link); each node of the four dimensional hypercube will thereby have direction connections to four other adjacent nodes. The communications network of the present implementation of System 10 is a twelve (12) dimensional hypercube, so that each node is directly connected to 12 other nodes.

The network connections provided by Router 26(i) between nodes are through a set of $2^{12}$ Hypercube Wires 44, wherein each node has 12 Hypercube Wires 44 connecting the node to 12 adjacent nodes. The Hypercube Wires 44 between the node illustrated in FIG. 3 and the 12 other nodes to which the node is directly connected is represented in FIG. 3 by the 12 Hypercube Wires 44(i).

The general interprocessor communication supported by Router 26(i) is performed by Router Unit (RU) 46(i) which, in the most general terms, receives interprocessor messages, either from a PR 22(i) within the node or through a Hypercube Wire 44(i) from another node, and forwards the message to the indicated PR 22(i), again either through a Hypercube Wire 44(i) to another node or to a PR 22(i) within the node. The RU 46(i)s of System 10 operate in parallel, using as many of the $2^{12}$ Hypercube Wires 44 as necessary, again in parallel, so that up to $2^{12}$ messages may be passed in parallel at a time. Each message may include, for example, the address of the destination PR 22(i), a command for an operation or a request, such as a read or write request, and the target address within a MEM 24(i) of the command or request, if necessary.

RU 46(i) contains a processor unit separate from the PRs 22(i) of the node and is capable of performing a number of specialized communications functions. For example, RU 46(i) will attempt to forward a message to another node through the Hypercube Wire 44(i) on the most direct, non-busy path to the destination node and will select among the 12 Hypercube Wires 44(i) accordingly. If a message cannot be forward to a destination node during a given clock cycle, the RU 46(i) will buffer the message in the RU 46(i) and forward the message in the next available clock cycle. Each RU 46(i) also includes logic to detect the presence in its buffers of a plurality of messages to the same processor and to perform a variety of combining operations on the messages. This combining capability reduces the time required for message communication by reducing the total number of messages, and may accelerate combining operations that would otherwise be performed by LCU 40 and GCU 28. Each RU 46(i) further includes the logic necessary to place messages in the correct areas of the MEMs 24(i) when PPU 14 is operating with virtual processes.

Each RU 46(i) further includes specialized logic, referred to as the NEWS (North-East-West-South) Grid, for direct nearest-neighbor communication between any set or subset of processes logically organized as a two dimensional array. The NEWS Grid uses the previously described mechanisms for within-node communication between virtual processes resident in a single PR 22(i) and communication between the PRs 22(i) of a node through Permutator Switch 42(i).

The NEWS Grid further provides a direct connection, represented in FIG. 3 as NEWS Direct Connect (NEWS DC) 48(i), between each node's Permutator Switch 42(i) and the node's Hypercube Wires 44(i). The NEWS DC 48(i)s of the nodes bypasses the general Router Unit 46(i) mechanism and allows a subset of the internode Hypercube Wires 44 to be selected to directly interconnect a subset of the nodes in a two dimensional array of nodes whereby messages may be passed directly between any given node of the array and its nearest neighbor to the "north", "east", "west" or "south".

In the NEWS Grid, the PRs 22(i) of a given node are directly connected by Permutator Switch 42(i) and NEWS DC 48(i) to the PRs 22(i) of a first adjacent node through one Hypercube Wire 44, for transmitting messages to that adjacent neighbor, and to another adjacent node through another Hypercube Wire 44(i) for receiving messages from the second neighbor. The two dimensional grid of the NEWS Grid communication pattern is sufficiently regular that the Permutator Switches 42(i) can directly determine the appropriate Hypercube Wires 44(i) for any NEWS Grid communication.

Finally, the Permutator Switch 42(i) and NEWS DC 48(i) of each node may connect each of the 12 Hypercube Wires 44(i) entering the node to 12 of the 16 PU 20(i)s of the node for "direct hypercube access" communications. Direct hypercube communications may be used, for example, to "spread" a value from one PU 20(i) to all other PUs 20(i) of a selected grid of nodes.

System 10 and the communications network of System 10 will not be discussed in further detail herein, but are described more fully in the previously referenced and incorporated U.S. Pat. Nos. 4,598,400, 4,709,327 and 4,814,973 to W. Daniel Hillis and U.S. patent application 07/043,126 by W. Daniel Hillis.

The following will next describe an implementation of the present invention in a data parallel system such as the exemplary System 10.

B. Memory Based Reasoning From Natural Language Data

As was described, memory based reasoning implemented in a massively data parallel system allows decisions or conclusions to be reached for a new set of data by directly comparing the new data to previous sets of data and the decisions or conclusions reached for each of the previous sets of data. The following will first discuss the principles of memory based reasoning from natural language data, and will then describe the implementation of the present invention on a data parallel system.

The example used to illustrate the present invention will be the classification of natural language responses received in the 1990 Census conducted by the United States Bureau of the Census. As part of the census profile of the people and industry of the United States, the Bureau of the Census collects Industry and Occupation data for individuals in the labor force and the industry and occupation data provided by the respondent in the census returns is in the form of free text fields, that is, each respondent describes their occupation and their industry in their own terms. The census questions which provide for free text responses include "For whom did this person work?, "What kind of business or industry was this?, "What kind of work is this person doing?, and "What are this person's most important activities or duties?.

The Census Bureau examines the industry and occupation free text fields in each return and decides upon "categories" for the industry and occupation described therein, that is, identifies the described industry or occupation as being a member of one of a set of predefined categories. This process is usually performed by clerical workers using procedural manuals and indexes and dictionaries of phrases to classify the returns.

To illustrate by an example taken from the Census Bureau phrase index to industry categories:

| Phrase: | | Industry Category: |
|---|---|---|
| Photographic Apparatus | 380 | Photographic Equipment and Supplies |

| Phrase: | | Industry Category: |
|---|---|---|
| Photographic Cameras and Supplies | 651 | Sporting Goods |
| Photographic Control Systems | 341 | Radio, TV and Communication Equipment - electronic | and so on.

The memory based reasoning system of the present invention, as implemented for the present example of classification of natural language census returns, utilizes a training database comprised of previously classified returns, wherein the predictor fields of the training database comprise the natural language returns of the previously classified samples and the target fields contain the industry and occupation codes assigned by the Census Bureau clerical staff. Each new return is matched with the entire training database and industry and occupation codes are assigned to the new return based on the industry and occupation codes of the previously classified returns.

As described below, the system of the present invention differs significantly from previous systems in each of the steps described above because of the fundamental differences between well-behaved data and natural language data.

The following will first discuss the principles of operation of the natural language data system of the present invention, and will then illustrate the present invention as implemented for classification of natural language census returns.

1. Features, Weights and Categories

Systems designed for use with well-behaved data use the terms "fields" and "features" interchangably to refer to fields that are useful in determining matches between a new sample and a training database example. It has been described, however, that in natural language data systems the value of fields in determining matches between a new sample and the training database examples is significantly reduced because the range of data values for any given field is open ended, the possible data values are not ordered, and the data values are not comparable across fields.

a. Features

The system of the present invention distinguishes between "fields" and "features", and makes use of this distinction in identifying the significant data elements by using features, which are in turn based upon the actual data values as the basis of comparison between a new sample and the training database examples. It should be remembered that the term "field" refers to a "slot" or space in a database for storing information while the term "value" refers to the actual contents of a "field".

In the present system, a "field" is an element of data within an individual example and is supplied a priori by the data itself. An example of a "field" in natural language data could be a word; for example, the free text phrase "The computer industry" appearing in a census return would thereby contain three fields, "The", "computer" and "industry".

A "feature" is an element or grouping of data that may not be provided a priori from the data itself, but is determined according to its value in achieving the purposes of the memory based reasoning system, such as classification of census returns. Features may be conjunctions of fields, or portions of fields, or combinations of portions of fields, and the conjunction of two fields or portions of fields may be more useful than either field by itself. In a natural language system such as the present example, features will be natural language terms extracted from the predictor data fields of the historic database, such as words, parts of words, canonical stems of words, and pairs of words or parts of words. In the present implementation of the system, features are comprised of words and all possible conjunctions between pairs of fields, wherein a field may in itself be a word or a portion of a word.

For example, in the classification of census returns, each return, on an average, contains 12 free text fields, which correspond to 144 ordered conjunctions of words or 72 features since the order of the fields in the conjunctions is ignored in the present system. Although the present implementation of the system uses two-element conjunctions, the principle of features as conjunctions of fields may be extended to n-element conjunctions and is primarily limited by computational and storage costs of the system.

It should be noted that fields may be created from words by coercing the words into canonical forms, for example, by stripping prefixes and suffixes from words to arrive at the canonical stems of the words. The results of classification of census returns with the system of the present invention indicate, however, that while fields may be created in this manner, it is preferable to also retain the original forms of the words as features. For example, the difference between the phrases "food and drink" and "food and drinks", wherein the word "drinks" commonly implies alcoholic beverages, is lost for the purposes of industry classification when the word "drinks" is stripped of the plural suffix "s". In a further example, it has been found in the classification of census returns that all but 2% of the occurrences of the feature "attorneys" belong to the "legal services" industry category while 32% of the word's singular form, that is, "attorney", belong to industry categories other than "legal services".

b. Weights

Given that the prediction of target field values is to be determined by comparison of features, rather than of selected field, it is necessary to determine the respective "weights" to be assigned to the identified features appearing in the training database according to their ability to discriminate between possible values of the target fields. As was described, the distance, or difference, metric used in previous memory based reasoning systems is of little assistance because the values of the features are not comparable.

b.1 Probability Weights

In the system of the present invention, the "weight" assigned to a feature is based upon the conditional probability that a target field T will have a value t given that a feature F occurs, and is hereafter accordingly referred to as the "probability weight" of the feature, as opposed to the "distance weights" used in memory based reasoning systems of the prior art.

To illustrate by example, the conditional probability weight for each feature F may be determined by determining, for each feature F and for all target fields T, the number of times the feature F occurs for each target field T, determining the sum of occurrences of the feature F for all target fields T, and normalizing to one the sum of the distribution of occurrences of feature F for each target field T by dividing the number of occurrences of feature F for each target field T by the sum of occurrences of features F for all target fields T. Each normalized value of occurrence of feature F for each target field T will then represent the conditional probability that a corresponding target field T will have a value t given that the feature F occurs.

This is analogous to constructing a histogram for each feature F across all target fields T wherein each element of the histogram represents the number of occurrences of feature F for each target field T, and then normalizing the sum of the distribution across the histogram to one, so that each element of the histogram then represents the conditional probability that a corresponding target field T will have a value t given that the feature F occurs.

As will be described below, the system of the present invention may use either or both of two probability weights in classifying natural language data. Also, for convenience in the following discussions a target field T having a value t will be referred to as target field T and the probability of a target field T given that a feature F occurs will be referred to as P(T/F).

b.2 Cross Target Probability Weights

An examination of a typical histogram of P(T/F) across all target fields T will usually show that certain features F are likely to appear for many or most of the target fields T while other features F appear for only a relatively few target fields T. It is thereby desirable to attach a probability weight to the various features F which reflects this relative importance of certain features F in the query of the training database with a new sample.

In the system of the present invention, this probability weight is referred to as the "cross-T feature importance" and is, for each feature F, the sum of the squared conditional probabilities P(T/F) across all target fields T. That is, the conditional probability of each feature F is determined for each target field T as described above and, for each feature F, the conditional probabilities so determined for the feature are squared and summed to determine the cross-T probability weight for the feature.

b.3 Per Target Probability Weights

A feature F in a new sample which is to be used to query the training database will have only one value with regard to the new sample's feature F. In the training database, however, that feature F will not necessary be of equal significance to all target fields T having the feature F associated with them.

That is, the cross-T feature importance of a feature F indicates the general importance of that feature F in querying the training database, but not the importance of that feature F with respect to any specific target field T. For example, a new census return may contain the feature "real estate". The distribution of that feature across the census categories may be such that the feature appears 90% of the time in association with the target field T of Occupation Category=C1 Real Estate Agent and 10% of the time in association with the target field T of Occupation Category=C2 Lawyer, as some lawyers specialize in real estate matters. The cross-T feature importance probability weight assigned to this feature will be high, $0.9^2 + 0.1^2 = 0.82$, and thus indicate that either target field T of Occupation Category=C1 or target field T of Occupation Category=C2 are equally good results.

While the cross-T feature importance probability weight is therefore of significant value in distinguishing certain subsets of target fields T from all target fields T, the cross-T feature importance probability weight is of less use in distinguishing between the target fields T of the subsets because the relative values of the conditional probabilities P(T/F) of the feature F with respect to the individual target fields T are absorbed into the single value of the feature's cross-T feature importance probability weight.

For this reason, the system of the present invention also assigns to the features probability weights referred to as the "per-T feature importance" probability weights. The per-T feature importance probability weights associated with each feature F are the conditional probabilities P(T/F) of the feature F with respect to all individual target fields T which have associated with them the feature F, and are determined as described in section b.1 above.

As will be described further below, each feature occurring in a new sample which is used to query the training database will thereby contribute a different importance, or probability weight, to each comparison match between the new sample and a training database example, depending upon the per-T feature importance probability weight of the feature with respect to the particular training database example of the match. As will be described, the system described herein may make use of either or both of cross-T feature importance probability weights and per-T feature importance probability weights.

c. Categories

Finally, certain data, such as that appearing in the census returns of the present example, exhibit a property which will be referred to herein as "categorization", which is to be distinguished from the use of the term "category" when that term is used in the sense of classification of census returns into various industry and occupation categories. While categorization is not essential to the most basic expression of the present invention, it can be of significant value in memory based reasoning, in particular in reasoning from natural language data, and is a significant feature of further implementations of the present invention.

Essentially, features may be described as "categorized" when the features or target field values are or may be structured or grouped into subsets and wherein the fact that a feature or target value is a member of a subset of the data or the target values is of value in predicting target field values. For this reason, the present system treats a feature which appears in identical form in two or more different categories to be an equivalent number of different features and distinguishes between the features and indicates the original sources of the features by "tags" attached to the features, usually as a suffix appended to each feature. The present system assigns each such source category distinguished feature its own cross-T and per-T probability weights, and uses each occurrence of the feature as separate features for forming conjunctive features. The present system also distinguishes between target field catagories, and determines target values separately for each of the target field catagories.

The present system thereby uses the source categorization of the predictor field values in the prediction of target field values by treating the occurrence of an identical feature in two or more source categories as being an equivalent number of different features, and target field catagorization by determining the target values separately for each target field catagory.

In the present example, each census return contains four free text data fields wherein two of the free text fields contain responses to questions regarding the person's industry category and two contain responses to questions regarding the person's occupational category. Each of the four free text data fields is broken up into word fields, wherein, as described, the words appearing in the word fields and conjunctions of the words are features, as may be portions of words and the conjunctions of portions of words. As described, a word, or feature, that appears in an occupation free text response field is considered to be different from the same word appearing in an industry free text field because the word will have different predictive values for the occupation and industry classification target fields depending upon whether the source of the word was a predictor field belonging to the occupation category responses or a predictor field belonging to the industry category responses.

Whether a given word originally appeared in a census return occupation category response field or an industry category response field is indicated by, respectively, the suffixes ".o" and ".i". For example, if the word "attorney" appears in an occupation response free text field, the word "attorney" is represented as the feature "attorney.o" while, if the word appeared in an industry response free text field, "attorney" is represented as the feature "attorney.i". These suffixes are retained in forming conjunctions of features, so that a conjunctive feature "attorney.i,secretary.o" is a different feature than "attorney.o,secretary.o", and so forth.

To illustrate the value of categorization, the word "attorney" appearing in an occupation response text field has significant classification probability weight in determining the occupation code to be that of an attorney. When the word "attorney" appears in an industry response text field, however, it is as likely that the occupation predictor target field value should be for a "clerk" or "secretary" as it is for attorney.

In the present example of classification of census returns there is a target field corresponding to each feature source category, that is, the target fields include an occupation classification field and an industry classification field and the source categories correspondingly include occupation question free text response fields and industry question free text response fields.

It is not necessary to the present invention, however, that there be a one to one correspondence between target fields and source categories; there may be fewer target fields than source categories, or even a single target field and a very large number of source categories. Similarly, the source categories need not reflect only the types of sources for features, as in the present example wherein the industry source category indicates a feature originating from a response to an industry question, but may reflect other qualities or properties of the sources of the features. For example, the source category may represent the reliability or probable accuracy of the source of the feature and may be used to adjust the predictive value of the feature accordingly.

2. Metrics, The Accumulation of Evidence for a Predicted Target Field Value

Having described the assignment of "probability weights" to the identified features appearing in the training database, the following will describe the comparison of new sample features to the training database examples and the use of the comparison results to achieve a prediction of target field values.

The system of the present invention may employ a number of metrics to combine the results of the comparisons of features between a new sample and the training database examples, and the selection of a particular metric may depend upon the data itself or the goal of the classification and possibly upon the source categories of the features. The following will consider certain of those metrics in turn, and will then discuss the uses of the different metrics in the present system.

a. The Summation Metric

The summation (SUM) metric is generally similar to the metrics used in memory based reasoning systems of the prior art in that it attempts to determine the "nearness" of a new sample to a training database example. For this purpose, SUM assumes that the nearness of a new sample to a training database example is proportional to the sum of the importance probability weights of the features in the new sample which match the features in the training database example.

Given that there are n matching features, $F_1$ to $F_n$, between a new sample and a training database example, the nearness of the new sample to that training database example, that is, the probability that the new sample will have the target field value of that training database example, may be expressed according to the SUM metric as:

$$\text{Nearness} = P(T/F_1) + P(T/F_2) + \ldots + P(T/F_n).$$

That is, the system generates a sum for each training database example by reading each feature of a new sample in turn and comparing each such new sample feature to the features of the training database examples. If a feature of the new sample matches a feature of a training database example, the sum being calculated for that training database example is incremented by the probability weight of that training database feature. The accumulated probability weights of the training database examples are them compared, and the target field value of the training database example having the highest accumulated sum is chosen as most probably representing the correct target field value for the new sample. A disadvantage of the SUM metric, however, is that training database examples having a large number of relatively low probability weight feature matches with the new sample may overweigh a more preferable training database example having relatively few but much higher probability weighted matching features.

b. The Maximization Metric

The maximization (MAX) metric considers all features in the new sample and selects the training database example having a matching feature that has the highest $P(T/F)$, that is, the training database example having the highest probability for classifying the new sample as having target field T given that the training database example has feature F matching a feature F of the new sample. The MAX metric is thereby based upon basic probability arguments and performs well when there are features F providing high values of $P(T/F)$ compared to the values of $P(T/F)$ for other features. The MAX metric is advantageous in that a list of features and their probability weights, that is, their $P(T/F)$s may be precomputed and stored in System 10 and the original data of the training database examples need not be retained, thereby substantially reducing storage and computation costs. The MAX metric, however, does not take into consideration multiple sources of evidence regarding the most probable value of the new sample target field, except as they are already incorporated into the features as conjunctions, and is less certain of providing a correct result when there are no features F providing high values of P(T/F) compared to the values of P(T/F) for other features. In general, the MAX metric provides results comparable to those of the SUM metric.

c. The Error Minimization Metric

The error minimization (ERROR) metric identifies the training database example having the lowest probability of error in predicting the value of the new sample target field given the features which are matched between the training database example and the new sample.

In this regard, the probability that a target field T will have a value t given the occurrence of a feature F has been expressed as P(T/F); the probability of an error, that is, that the target field T does not have the value t given the occurrence of the feature F may be expressed as $P_e(T/F) = [1 - P(T/F)]$. Given that there are n matching features, $F_1$ to $F_n$, between a new sample and a given training database example, the total probability of an error, $P_{eT}$, in predicting the value of the new sample target field as the same as that of that training database example may be expressed as:

$$P_{eT} = \{[1 - P_1(T/F_1)][1 - P_2(T/F_2)][1 - P_3(T/F_3)] \ldots [1 - P_n(T/F_n)]\}, \text{ or}$$

$$P_{eT} = \{[P_{e1}][P_{e2}][P_{e3}] \ldots [P_{en}]\}, \text{ and}$$

the probability that the new sample has the same target field value as the training database example, that is, that the training database example is the closest match to the new sample, may be expressed as:

$$\text{Nearness} = 1 - P_{eT}.$$

The present system generates a probability of error $P_{eT}$ for each example in the training database by reading each feature of a new sample in turn and comparing each such new sample feature to the features of the training database examples. If a feature of the new sample matches a feature of a training database example, the system determines the probability of an error due to that feature $P_e(T/F)$ and, when all features of the new sample have been considered, determines the $P_{eT}$ for the example. The system may then select the training database example having the lowest $P_{eT}$, or conversely the highest "nearness" $= 1 - P_{eT}$ as having the highest probability of providing the correct value for the new sample target field.

The ERROR metric avoids the potential disadvantages of the SUM metric in that, if there is a training database example with a single feature or small number of features with high P(T/F), then that feature or features will have a large effect on the cumulative match score for the example, that is, in giving the example a correspondingly low probability of error. In this regard, if any feature in the training database example has a P(T/F)=1, then there cumulative error value for that example is zero, independently of any other matching features.

The ERROR metric also avoids the potential disadvantages of the MAX metric in that each feature of an example with a non-zero probability weight contributes to increasing the certainty of the match between the example and the new sample. For example, if there are two training database examples representing different target field values, and each has a number of moderately weighted features but no single features with very high weights, then the example selected will be that with the most matching features and hence the lowest cumulative error.

The ERROR metric thereby behaves like the SUM metric in some cases and like the MAX metric in other cases by giving strong weight to any feature with a very high P(T/F), but taking into consideration additional information from other features, and has been found to provide more accurate results, at least with regard to the present example of classification of census returns, than either the SUM metric or the MAX metric.

It should be noted that the SUM, MAX and ERROR metrics of the present system inherently retain and consider all training database examples in querying the database with a new sample, unlike many memory based reasoning systems which perform distance based comparisons on fields of well-behaved data and which often restrict the training database to only those examples having high distance weights. The present system may be directed to restrict the training database examples to be used when querying the database with a new sample, such as when the user wishes to reduce computation time by reducing the number of database examples to be considered or wishes to limit the database to examples having certain characteristics, as in the previous example of a search of a medical database for gender linked diagnoses; this restriction, however, is at the user's election and is not inherent in the SUM, MAX and ERROR metrics.

3. Selection of the Best Match, K Nearest Neighbors

In many databases, and in particular in large databases, there may be many database examples, referred to as "nearest neighbor" examples, which have lesser match scores with the new example than does the nearest example, but which are sufficiently close matches to be used in determining whether the nearest example does in fact contain the target field value t. For example, if a large number of nearest neighbor examples had the same target value as the nearest example, a higher confidence may be assumed in the nearest example as the correct answer to the query than if many of the nearest neighbor examples had a different target value or many different target values.

In the k nearest neighbor method, the new sample to database example comparisons are performed as described above and the k matches having the highest comparison scores, that is, the k nearest neighbor examples, are identified, without regard to the target field values of the selected examples. The k best matches, where k may for example be 10 to 15, are then aggregated by target field values and the target field value having the highest aggregate match score used as the target field value for the new sample.

In those cases where there is a single target field value clearly having the highest aggregate match score, the k nearest neighbor method provides the same answer as the nearest example. If there are a number of near matches, however, the k nearest neighbor method can protect against overvaluing a single spurious near match and increase the probability that a correct metch has been chosen by reducing the possibility of an incorrect match based on a single spurious near match. In an example taken from the classification of census returns and using k=15, the features "apprentice" and "painter" led to an erroneous single nearest example classification of "carpenter apprentices", which had the highest nearest neighbor match score. The k nearest neighbor method, however, led to a correct classification of "painters, construction" because the target field "painters, construction" occurred in 7 out of the top 15 nearest neighbors while the target field "carpenter apprentices" occurred in only 1 out of the top 15 nearest neighbors.

It should be noted that the k nearest neighbor method of selecting the target value for a new example may be optimized by selection of the number k. Experiments with the classification of census returns used values of k from 4 to 25 and, in this instance, the optimum values of k were found to be 12 for classification of occupations and 15 for classification of industries. The value of k therefore may vary with the type of data being used and the number of features being considered in the matches and may vary with the size of the database.

The performance of the k nearest neighbors method, and that of any of the above described metrics for determining the match between a new sample and a training database sample, may be further improved by the use of confidence scores to adjust the match score of the best match.

In general, a confidence score reflects the probability that a correct match has been selected for the new sample and, for a given required level of accuracy, a high confidence score for a metric indicates a better separation of good matches from poor matches and correspondingly a higher percentage of new samples that may be processed by the system without, for example, the need for human assistance in the classification of a new sample.

In one approach, the match score itself may be used as a confidence score, this does not take into account matches from other training database examples that may have match scores close to that of the best match. In order to include the effect of having other training database examples whose match scores closely compete with the best match example, the system may compare the score of the best matching example with that of the next best matching example and adjust the match score of the best match with $A/(A+B)$ where A is the score of the best match and B is the score of the next best match. This confidence score adjustment thereby reduces the match score of the best matching example when the match score of the best and next best matching examples are close and, as is apparent from the above discussion of the k nearest neighbor method, increases the probability that a correct classification will be attempted rather than being rejected or referred to a human expert.

A confidence score may preferably be determined directly using the k nearest neighbors method, however, as a ratio of the aggregates of match scores by target fields. In this instance, the confidence score is determined as $(A/A+B)$ where A is the aggregate of the match scores of the best target field and B is the aggregate of the match scores of the second best target field. The system may then make a decision, based on this confidence score, on whether or not to attempt a classification with a resulting increase in the probability that a correct classification will be attempted, rather than rejected or referred to a human expert.

4. Thresholds, Accuracy and Coverage

Before turning to a discussion of the various metrics and methods described above, it is necessary to note that the performance of the present system, as of any such system, is reflected in the coverage and accuracy of the system in processing new samples. Basically, coverage is the percentage of all new samples that have been successfully attempted by the system, that is, for which the confidence score exceeds a selected threshold, rather than being rejected or, for example, referred to human experts. Accuracy is the percentage of the coverage for which correct target field values have been identified.

An ideal system would have high coverage, that is, a successful query is made for almost all new samples, and high accuracy, that is, few mistakes are made in identifying a new sample's target field value. In general, however, both goals cannot be simultaneously maximized and a compromise between coverage and accuracy must be made with the compromise generally being dependent upon the function and purpose of the system. In the present example of classification of census returns, the system accuracy was selected to be comparable to that of human census classification experts and the coverage adjusted as necessary to meet this accuracy goal. In a medical database, for example, it may be desirable to set very high levels of required accuracy and accept a reduced level of coverage while in a literature search system it may be desirable to accept a lower level of accuracy in order to gain the widest reasonable search for a reference. In certain systems it may be desirable to adjust the levels of accuracy and coverage according to the type of search being performed, from wide coverage, lower accuracy in the initial stages of a search to a higher accuracy search among the database examples identified from the initial search. In a similar manner, it may be desirable to reduce the accuracy of a search and obtain wider coverage if an initial high accuracy search has failed to find matches between a new sample and the database examples.

The compromise between accuracy and coverage may be selected by setting "referral thresholds", such that if the match score of the best matching example or the confidence score determined by the ratio of the aggregates by target fields, as described above with reference to k nearest neighbors, does not meet or exceed the threshold, the query is, for example, rejected or referred to a human expert for consideration.

5. Selection of Metrics

The above has described a number of factors which effect the performance of a memory based reasoning system of the present invention, such as the use of features rather than fields, probability weights, per-T and cross-T feature importance weighting, combination metrics such as the SUM, MAX and ERROR metrics, and the use of k nearest neighbors to select the most probable target field value. Various combinations of these factors were used experimentally in the system of the present invention to determine which combination of methodologies provided the optimum results in the present example of occupation and industry classification of census returns.

Figure 4A:
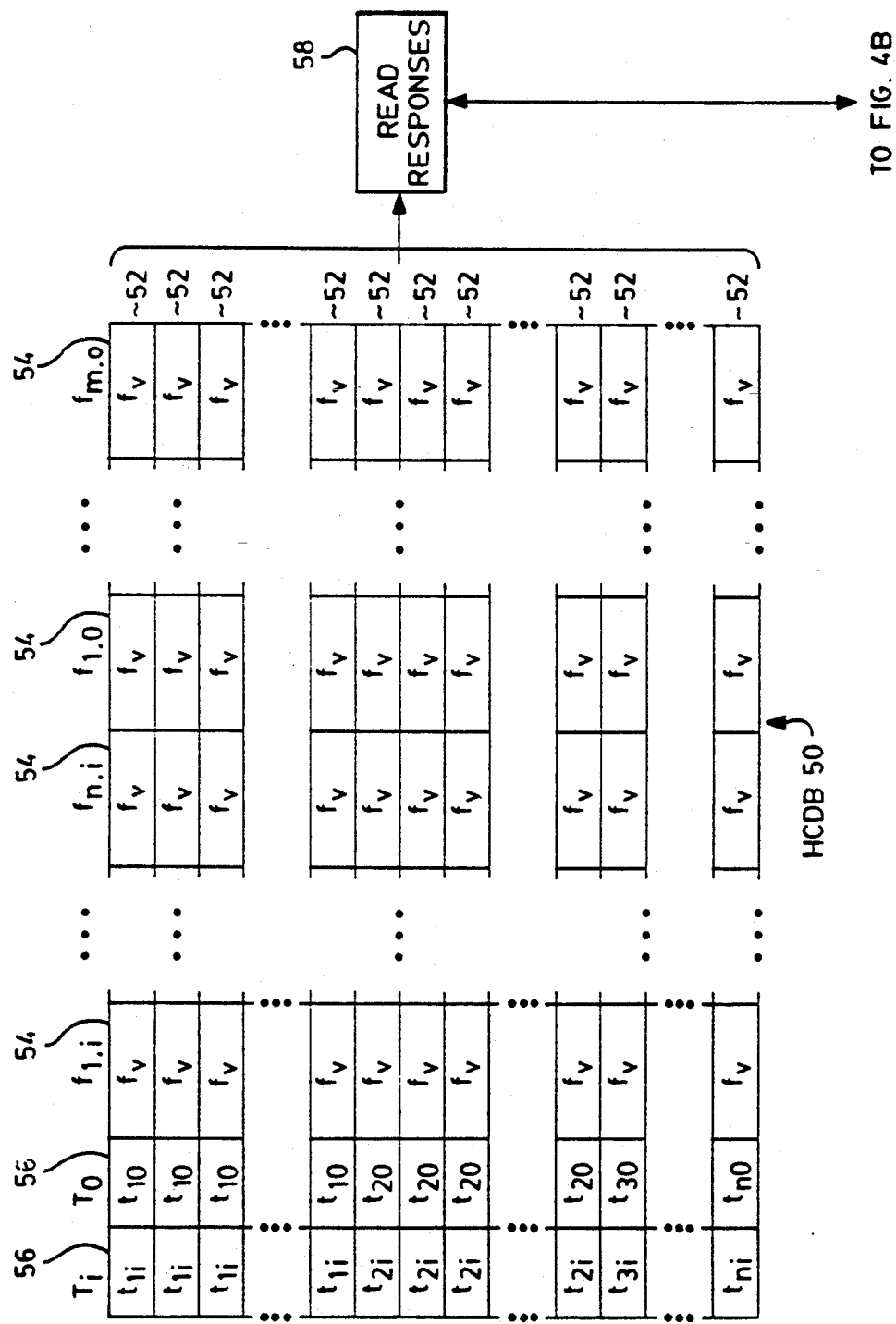
FIGS. 4A-4B is a diagrammatic representation of the construction of a training database according to the present invention.
Figure 4B:
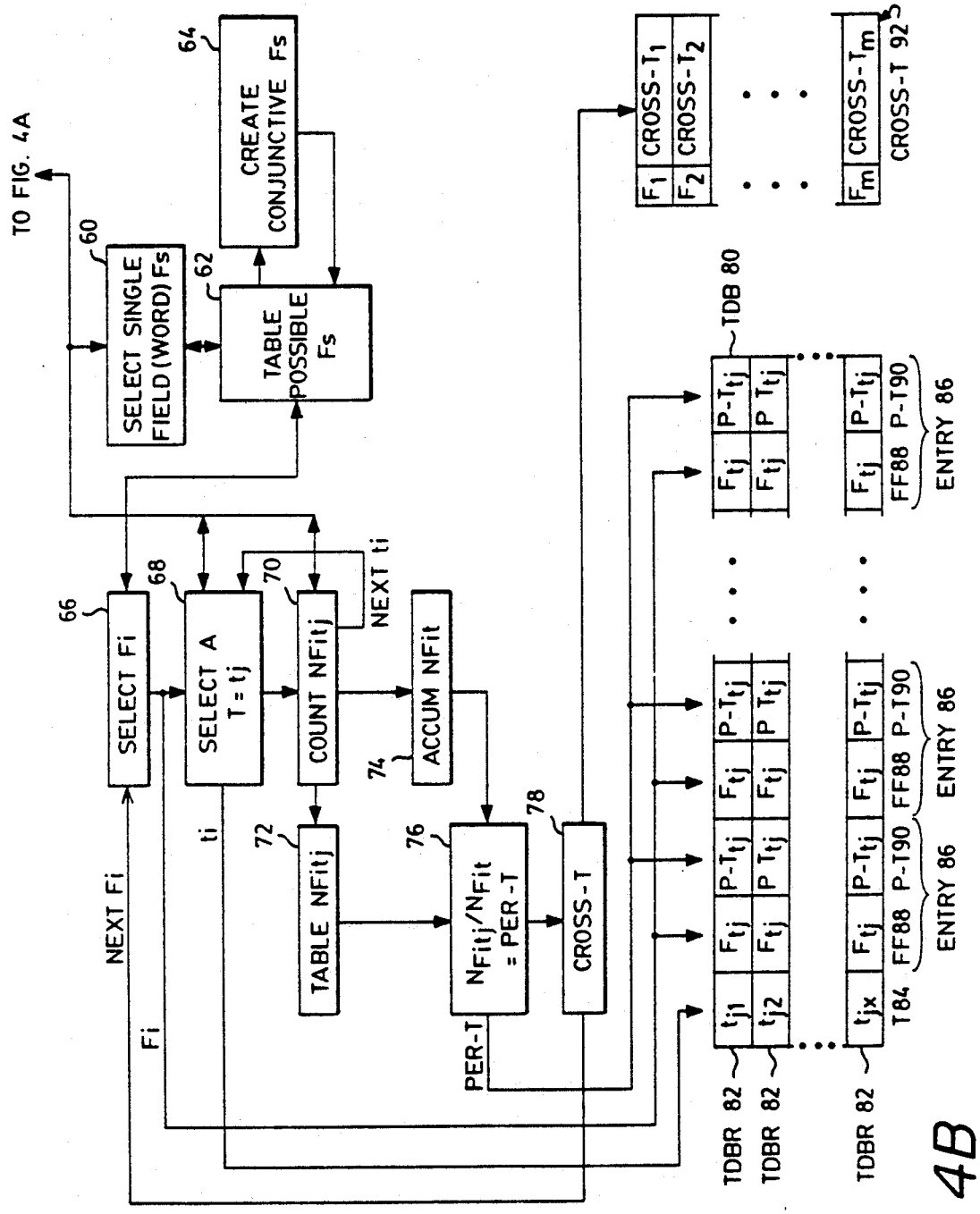
Figure 5:
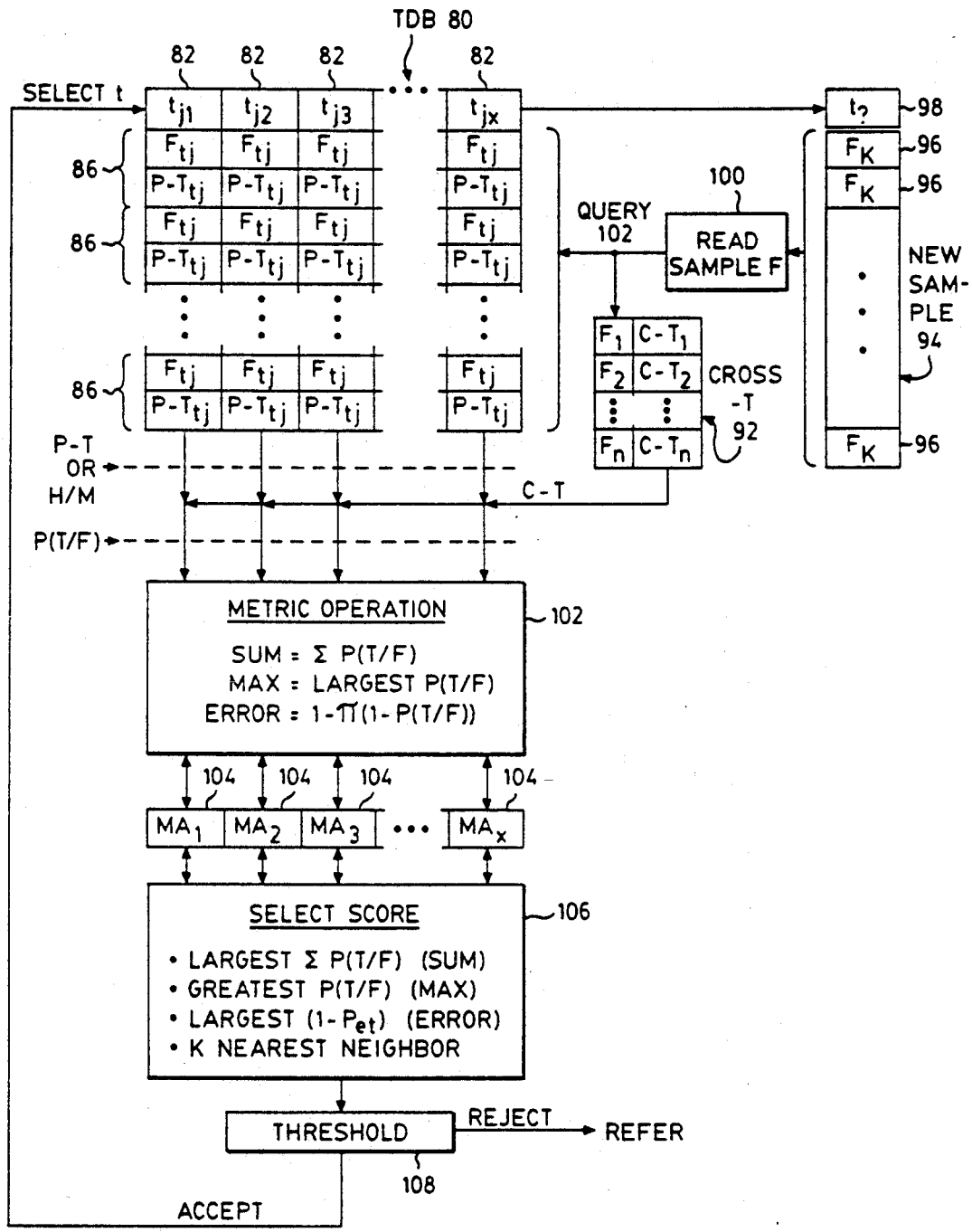
FIG. 5 is a diagrammatic representation of the classification of records containing natural language data according to the present invention.

While it has been found that many of the above factors, in various combinations, were very successful in meeting the goals of the system. It has also been found that the particular combination of the above factors which provides the optimum results in achieving the goal of the system may often be dependent upon the characteristics of the data being operated upon, possibly the source category characteristics of the data, and upon the task the system is to accomplish. For example, while it was found that probability weighted feature metrics perform better than unweighted metrics in all instances, but that per-T weighting of conjunctive features using the ERROR metric performed best for classifying returns with regard to industry, and that cross-T weighting of single field features using the SUM metric and k nearest neighbors performed best for classifying returns with regard to occupation.

c. Implementation of Memory Based Reasoning With Natural Language Data (FIGS. 4A-4B and 5)

Having described the basic principles of the present invention with respect to memory based reasoning in a parallel data machine for natural language data, the following will describe an implementation of the present invention using as an example the classification of natural language census returns.

1. Construction of the Training Database (FIGS. 4A-4B)

The present invention first requires the construction of a training database comprised of records having predictive data fields containing the features relevant to classification of new samples of census returns and the probability weights determined for the features stored therein and target value fields containing the results of classification of previous returns. This process is illustrated in FIGS. 4A-4B, which contains diagrammatic representations of the data structures constructed and used in this process and the operations performed on these data structures.

While the training database may be constructed on a conventional sequential computer, the parallel data processing capabilities of System 10 described herein are well suited for this task and it may be assumed for the following discussions that such a data parallel system is used to construct the training database.

As illustrated in FIGS. 4A-4B, the construction of the training database begins from a Historic Census Database (HCDB) 50 comprised of a large number of previously classified Records 52, each of which is a census return which has been classified as to industry and occupation by a human expert. As has been previously described, the census return data exhibits both source data categorization and target field categorization. That is, certain of the data fields of each of the Records 52 contain information pertaining to the respondent's industry and others information pertaining to the respondent's occupation and each classified Record 52 in HCDB 50 will include a target field relating to the respondent's industry classification and a second target field relating to the respondent's occupation classification.

Each Record 52 includes a plurality of predictor data fields 54 which contain the natural language data provided in response to questions pertaining to the respondents industry and occupation; these data fields are generally indicated as $Field_{1,i}$ 54 ($f_{1,i}$ 54) through $Field_{n,i}$ 54 ($f_{n,i}$ 54), representing n data fields containing natural language data values ($f_v$) pertaining to the respondent's industry and as $Field_{1,o}$ 54 ($f_{1,o}$ 54) through $Field_{m,o}$ 54 ($f_{m,o}$ 54), representing m fields containing natural language data values ($f_v$) pertaining to the respondent's occupation. Each Record 52 also includes target data fields identified as a Target Field ($T_i$) 56 containing the target value $t_i$ representing the respondent's industry category and a Target Field ($T_o$) 56 containing the target value $t_o$ representing the respondent's occupation category.

It may be assumed for clarity of discussion in the following descriptions of the operations performed to construct the training database that each Record 52 of HCDB 50 resides in a process in a MEM 24(i) of the PEs 20 of System 10, and that all operations performed with regard to a Record 52 are performed by the PR 22(i) associated with the MEM 24(i) in which the Record 52 resides, the LCUs 40 and GCU 28, all operating under control of instructions issued by Sequencer 30 as directed by programs executed by HOST 12. In the event that the Records 52 exceed the capacity of the memory spaces of MEMs 24(i), each Record 52 may be organized to reside in a plurality of processes residing in a plurality MEMs 24(i) associated with a corresponding plurality of PEs 20. HCDB 80 would then be organized differently with respect to the address space of System 10, and operations with regard to any given Record 52 would require parallel operations from a plurality of PEs 20, but would be conceptually and functionally the same as illustrated in FIGS. 4A-4B. Conversely, a plurality of Records 52 may reside in each of a number of MEMs 24(i) of System 10, each in a separate virtual process, and as previously described, the PR 22(i) associated with each MEM 24(i) will perform all operations on each of the Records 52 residing in virtual processes in its associated MEM 24(i) in turn.

The first sequence of operations determines, from the information in the fields of Records 52 of HCDB 50, the features which may be of use in predicting the values of the target fields, that is, the industry and occupation categories of new samples of census Records. As was described, features may be conjunctions of fields, or portions of fields, or combinations of portions of fields. In the present example, features are comprised of words and all possible conjunctions between pairs of fields, wherein a field may be a word or a portion of a word.

This process is performed by Read Response Operation 58 (Op 58) which operates under control of Select Single Fields (Words) Operation 60 (Op 60) to read the contents of Fields 54 from Records 52. Op 60 in turn identifies and selects possible features from the natural language data in Fields 54 and in turn constructs a Table of Possible Features (TPF) 62 of the possible unique single word features and operates with Construct Conjunctive Features Operation 64 (OP 64) to determine and write into TPF 62 the possible features comprised of the unique conjunctions of two words or fields.

As has been described, the data contained in HCDB 50 exhibits source categorization and, accordingly, a feature which appears in identical form in two or more different categories, for example, in both industry related Fields $54_i$ and occupation related Fields $54_o$, will be identified and treated as an equivalent number of different features which will be distinguished according to their source categories by "tags" attached to the features. For example, the word "computer" appearing in both industry and occupation data fields of HCDB 50 will be construed as two features, "computer.i" and "computer.o".

Having identified the features that may be of predictive value in determining the target field values of new samples of census Records, the next sequence of operations determines the probability weights of the features. As has been described, the system of the present invention may use either or both of per-T and cross-T weights, depending upon the inherent characteristics of the data being operated upon. While certain forms of data may require only one of these types of probability weights, it has been found in the present illustration, for example, that per-T weighting of conjunctive features using the ERROR metric performed best for classifying returns with regard to industry and that cross-T weighting of single field features using the SUM metric and k nearest neighbors performed best for classifying returns with regard to occupation. Other forms of data may also require the use of both forms of probability weights for optimum performance and the use of both forms of probability weighting are illustrated in the present example.

In this process, Select $F_i$ Operation 66 (Op 66) will select a Feature i from TPF 62 and, for this Feature i, Select $T=t_j$ Operation 68 (Op 68) will query HCDB 50 through Op 58 to select a target field value $t_j$ for which Feature i occurs, where each $t_j$ may be a $t_i$ or $t_o$ value from a $T_i$ or $T_o$ Field 56 of HCDB 50. Op 68 and Count $N_{Fitj}$ Operation 70 will, operating through Op 58, determine the number of times ($N_{Fitj}$) that Feature i occurs for target value $t_j$ and a number $N_{Fitj}$ will be stored in Table $N_{Fitj}$ 72 for each combination of a Feature i and a target value $t_j$.

As $N_{Fitj}$ is determined for each successive value of $t_i$ for a given Feature i, a number $N_{Fit}$ will be accumulated and stored in Accum $N_{Fit}$ 74 where the number $N_{Fit}$ represents the total, cumulative number of times the Feature i occurs across all target field values $t_j$ for which the Feature i occurs.

After the numbers $N_{Fitj}$ and $N_{Fit}$ have been determined for a given Feature i and for all target values $t_i$ for which the Feature i occurs, the numbers $N_{Fitj}$ for each $t_i$ are read in succession from Table $N_{Fitj}$ 72 and divided by the number $N_{Fit}$ in $N_{Fitj}/N_{Fit}$ Operation 76 (Op 76). The result of each $N_{Fitj}/N_{Fit}$ operation is the per-T probability weight for that combination of a Feature i and a target field value $t_i$, as has been previously described.

Concurrent with the determination of the per-T probability weights for a Feature i for successive values of $t_i$, Cross-T Operation 78 (Op 78) will generate the accumulated sum of the squares of the results of the successive $N_{Fitj}/N_{Fit}$ operations over all values of $t_i$ and the accumulated sum will represent the Cross-T probability weight for that selected Feature i, as has also been previously described.

The process described above will then select a new Feature i and will be repeated for all values of $t_i$ for which that Feature i occurs, and will be successively repeated to generate the per-T and cross-T probability weights for successive Features i until the per-T and cross-T probability weights of all Features i have been determined. In this regard, it should be noted that the system may avoid recalculating weights for a feature that has already been calculated by having Create Conjunctive Fs 64 check the features for which Cross-T weights have been previously calculated and stored in a Cross-T 92, described below, as indicated by the link between Cross-T 92 and Create Conjunctive Fs 64.

The Training Database (TDB) 80 is constructed as the processes described above determine the per-T and cross-T probability weights for successive features and target field values and is comprised of a plurality of Training Database Records (TDBRs) 82, each of which resides in a process resident in a MEM 24(i) of a PE 20(i) of System 10. The PRs 22(i) pf the PE s20(i) associated with the TDBRs 82 of TDB 80 receive the information for each TDBR 82 from the PEs 20(i) associated with the Records 52 of HCDB 50 as the features, target field values and probability weights are determined or generated according to the above described processes, and construct the TDBRs 82 in processes in their respective associated MEMs 24(i).

As illustrated in FIG. 4B, each TDBR 82 corresponds to one of Records 52 of HCDB 50 and, in particular, to one target value field of a Record 52. As has been described, each Record 52 may contain a multiplicity of target fields, for example, one for industry category and one for occupation category, so that TDB 80 will then, as represented in FIG. 4B, contain a corresponding multiplicity of TDBR 82s for each Record 52 of HCDB 50. In this example, TBD 80 will contain, for each Record 52, one TDBR 82 corresponding to the industry category field of the Record 52 and one TDBR 82 corresponding to the occupation category field of the Record 52.

Each TDBR 82 includes a target data field identified as Target Value Field (T) 84 which contains a target value $t_j$ from the corresponding target field of the corresponding Record 52, wherein the target value $t_j$ appearing in the T 84 field may be either a $t_i$ or $t_o$ value of the Record 52. Each TDBR 82 also includes a plurality of Entrys 86, wherein each Entry 86 contains a predictor data field identified as Feature Field (FF) 88 which contains a feature $F_{ij}$ which occurs in the Record 52 for the corresponding target field value $t_j$. Each TDBR 82 thereby corresponds to and identifies, for one of Records 52, and for a single one of the target fields appearing in the Record 52, the target value $t_j$ appearing in the target field and each Feature i which occurs in that Record 52 and for the target field value.

In the event that per-T probability weights are to be used in determining the target field values of the new samples, each Entry 86 will also, in the presently preferred embodiment of the invention in System 10, include a Per-T Field (P-T) 90 which contains the per-T probability weight, P-$T_{tj}$, of the feature $F_{tj}$ residing in the FF 88 field of the Entry 86.

In this regard, and as has been described, each per-T probability weight relates to a unique combination of a Feature i and a target value $t_j$, so that there will be a P-$T_{tj}$ for each $F_{ij}$ appearing in TDB 80. While the per-T probability weights associated with each feature may be stored in a database separate from TDB 80, as described below with regard to cross-T weights, a query of TDB 80 with respect to a feature from a new sample would require System 10 to generate all combinations of the feature with all possible per-T weights for the feature and to query TDB 80 each individual combination of the feature and per-T weight for the feature. By storing each P-$T_{tj}$ with its associated $F_{tj}$, all of the TDBRs 82 of TDB 80 may be queried in parallel for occurrences of a feature of a new sample, using only the feature as an index into the TDBRs 82 of TBD 80. As described below, each such query will provide both indications of each occurrence of a query feature in association with a target value $t_j$ and the per-T probability weight associated with the query feature for each such target value, thereby substantially reducing the computational workload in querying TDB 80 with features from new samples.

In the event that cross-T probability weights are to be used in determining the target field values of new samples, the cross-T probability weights determined for each of the features are, in the presently preferred embodiment of the invention in System 10, stored in a Cross-T database (Cross-T) 92 which is associated with and functionally a part of TDB 80, but separate from TDB 80. As will be discussed further below, Cross-T 92 is implemented in a present embodiment of the invention as a hash table residing in Host 12. As has been described, there is a single cross-T probability weight for each feature in TDB 80, as opposed to the multiple possible per-T weights for each feature. For this reason, it is computationally reasonable to query TBD 80 with a feature from a new sample to determine the occurrences of the feature in association with target values in TDB 80 while providing the cross-T weight associated with each such feature from the separate Cross-T 92, thereby reducing the memory space required in the MEMs 24(i) for storing the cross-T weights in TBD 80 with the features. In alternate embodiments, however, the cross-T weights may be stored in Entrys 86 of TBD 80 with their associated features $F_{tj}$ and, in this case, each Entry 86 will further comprise a C-T field containing the cross-T weight associated with the feature $F_{tj}$ of the Entry 86.

Finally, for ease and clarity of presentation TDB 80 as shown in FIG. 4B as if each TDBR 82 of TDB 80 resides in a process residing in a single MEM 24(i) associated with a single PE 20(i) of System 10. In the event that the TDBR 82s exceed the capacity of the memory spaces of MEMs 24(i), each TDBR 82 may be organized to reside in a plurality of processes residing in a plurality MEMs 24(i) associated with a corresponding plurality of PEs 20. TDB 80 would then be organized differently with respect to the address space of System 10, and operations with regard to any given TDBR 82 would require combining the results of operations from a plurality of PEs 20, but would be conceptually and functionally the same as illustrated in FIGS. 4A–4B. Conversely, a plurality of TDBRs 82 may reside in each of a number of MEMs 24(i) of System 10, each in a separate virtual process, and as previously described, the PR 22(i) associated with each MEM 24(i) will perform all operations on each of the TDBRs 82 residing in virtual processes in its associated MEM 24(i) in turn.

Further, TDB 80 may be constructed in a number of different ways, depending on the specific sequences of steps in carrying out the basic processes described above. For example, System 10 could construct TDB 80 as an entity, that is, making a first pass through HCDB 50 to identify all target values and features and constructing TDB 80 as a "form" of rows and columns with the target values and features to be subsequently filled in. System 10 could also construct TDB 80 piecemeal, identifying each feature, one at a time, and determining the target values and weights for each feature in turn.

In constructing TDB 80 as an entity, System 10 operating through Op 58 could first scan HCDB 50 for all Records 52 and target fields occurring therein and could being construction of TDB 80 by defining a TDBR 82 "row" for each Record 52 and target field found in HCDB 50, entering the target values $t_j$ into the T 84 entry positions of the TDBR 82 "rows" as appropriate. System 10 would then execute the above described process to identify each of the features of all Records 52, determine the probability weights of the features and accordingly construct the Entry 86 "columns" of TDB 80 in succession for each feature found in HCDB 50.

In the piecemeal approach, System 10 could construct a TDB 80 which had a TDBR 82 for each unique target value $t_j$ appearing in HCDB 50 and each such TDBR 82 would contain all features and probability weights relating to the target value $t_j$ of the TDBR 82. In this approach, System 10 would still follow the basic sequence of operations shown and described with reference to FIGS. 4A–4B, but would construct TDB 80 piecemeal. In this case, System 10 first selects a feature from HCDB 50 and then determines the target values for which each feature occurs and the corresponding probability weights. Visualizing this process in terms of the mechanics of constructing TDB 80 as represented in FIGS. 4A–4B, the process would begin by constructing a single Entry 86 "column" of TDB 80 together with the T 84 "column" of target value $t_j$ entries for each of the Records 52. After completion of the first feature read from HCDB 50, TDB 80 would contain a single Entry 86 "column" and the single T 84 "column" and would contain a TDBR 82 "row" for each different target value $t_j$ for each of Records 52. The process would then select a next feature and generate a second Entry 86 "column" for this next feature, adding further TDBR 82 "rows" as new Records 52 having target values $t_j$ which did not occur with the previously considered feature or features were discovered, and so on until TDB 80 is completed. While this method for constructing a TDB 80 reduces the number of TDBRs 82 required to store all information extracted from the original HCDB 52, the direct one-to-one correlation between the Records 52 of HCDB 50 and the TDBRs 82 of TDB 80 is lost. Also, and because of the loss of correlation between historic census records and the training database records, the k nearest neighbor methodology cannot be applied as k nearest neighbors depends upon identifying the number of records which either match or are a close match to a new sample. In fact, the ability to perform SUM and Error metric calculations is also lost for the same reason. Also, and again for the same reason, it is then more difficult to add newly classified records to the training database; where the one-to-one relationship is maintained, adding a newly classified record was, in the previous method, merely a matter of adding one or more new TDBRs 82 to the TDB 80.

Further, and in a like manner, the actual detailed structure of TBD 80 may be implemented in a number of ways. For example, TBD 80 is organized in FIG. 4B so that each TDBR 82 contains the information, that is, features and probability weights, relevant to a single target field of a single Record 52. While each record in HCDB 50 relates to a single census Record, each such record contains multiple target fields, that is, both the industry and occupation category fields and TBD 80 may accordingly be constructed to directly mirror HCDB 50, wherein each TDBR 82 would contain multiple target fields. The features and probability weights associated with each of the multiple target fields may be distinguished by appropriate "tagging" of the features and probability weights to indicated relationships between the features, probability weights and target field values, but the training database would otherwise be similar to and have the same advantages as the training database organization illustrated in FIGS. 4A–4B.

Finally, the functions of the various elements of System 10 in performing the above described operations will be well understood by those of ordinary skill in the art without further detailed discussion after reference to Section A, Description of a Data Parallel System, and the accompanying FIGS. 1, 2 and 3. In general, all operations which may be performed on a number of data elements in parallel will be performed in PPU 14 operating under control of Host 12 and Sequencer 30 while operations involving a relatively small number of data elements will be performed by Host 12, often using the global result, combine and sum capabilities of GCU 28. For example, and as described above, HCDB 50 and TDB 80 will reside in the virtual processors of PPA 18 while Host 12 will perform Operations 58, 60 and 64 to read combinations of features and target values from HCDB 50, build TPF 62, and broadcast the combinations of features and target values to the PEs 20($i$). The PEs 20($i$) will compare the broadcast combinations of features and target values to the contents of Records 52 and accumulate counts $N_{Fitj}$ of the numbers of matching combinations in their virtual processors. Host 12 and GCU 28 may then scan the virtual processors to read the $N_{Fitj}$ results, generate the numbers $N_{Fit}$, and broadcast the $N_{Fit}$ numbers to each virtual processor, each virtual processor then calculating the per-T probability weights. Host 12 and GCU 28 are then used to calculate the cross-T probability weights, as described above, which are then written into Cross-T 92.

It will be understood by those or ordinary skill in that art that the operations described herein may be implemented in yet further different forms, without deviating from the essential character of the operations performed in constructing the training database, and that the specific operations illustrated above are exemplary rather than definitive and restrictive.

Having described the construction of Training Database 80 and associated Cross-T database 92 the following will describe the classification of new sample census returns according to the present invention.

2. Classification of New Sample Census Returns (FIG. 5)

Referring to FIG. 5, therein is illustrated the classification of census returns using System 10 and the Training Database 80 according to the present invention. It will be noted that TDB 80 has been reoriented in FIG. 5 for clarity of discussion, but that the structure and contents of TDB 80 are the same as shown in FIGS. 4A-4B.

Again, it may be assumed that the TDBRs 82 of TDB 80 reside in processes in the MEMs 24($i$) of the PEs 20 of System 10, as does Cross-T 92, and that all operations are performed by the PRs 22($i$), LCUs 40, and GCU 28 operating under control of instructions issued by Sequencer 30 under control of programs executed by HOST 12. In the present example, and as previously discussed, each TDBR 82 of TDB 80 resides in the process spaces of a single MEM 24($i$) of a PE 20($i$), so that each TDBR 82 has associated with it the PR 22($i$) of the PE 20($i$), which operates under control of Sequencer 30 to perform the operations described below on the data residing in the TDBR 82. In the event that the TDBR 82s exceed the capacity of the memory spaces of MEMs 24($i$), each TDBR 82 may be organized to reside in a plurality of processes residing in a plurality of MEMs 24($i$) associated with a corresponding plurality of PEs 20. TDB 80 would then be organized differently with respect to the address space of System 10, and operations with regard to any given TDBR 82 would require combining the results of operations from a plurality of PEs 20, but would be conceptually and functionally the same as illustrated in FIG. 5. Conversely, a plurality of TDBRs 82 may reside in each of a number of MEMs 24($i$) of System 10, each in a separate virtual process, and as previously described, the PR 22($i$) associated with each MEM 24($i$) will perform all operations on each of the TDBRs 82 residing in virtual processes in its associated MEM 24($i$) in turn.

It will be understood by those of ordinary skill in the art that the operations described herein may be implemented in different forms, without deviating from the essential character of the operations performed in constructing the training database, and that the specific operations illustrated in are exemplary rather than definitive and restrictive.

The classification process begins with a New Sample 94, which is a new census return having a plurality of Features $F_k$ 96 but having at least one target field 98 having an unknown target value $t_?$. As has been described, the census returns of the present example will each have two target fields with unknown values, one for the industry category and one for the occupation category.

Read Sample F Operation (Op 100) will identify and read each of features $F_k$ 96 from New Sample 94 in succession and will generate, for each feature $F_k$ 96, a Query 102 to all TDBRs 82 of TDB 80 in parallel. In this regard, it should be noted that in the presently preferred embodiment of the invention, New Sample 94 and Cross-T 92, which is associated with and functionally a part of TDB 80, will reside in HOST 12, which as described executes programs controlling all operations of PEs 20($i$) through sequences of microinstructions issued by Sequencer 30 operating under direction of the programs executed by HOST 12. HOST 12 will itself, however, execute certain of the operations performed in classifying census returns, such as parsing the features $F_k$ 96 of a New Sample 94 and reading the corresponding cross-T weights from Cross-T 92 to be broadcast to the PEs 20($i$) for use in the feature comparison operations described below. As was described previously, Cross-T 92 is, in the present implementation of the invention, resident in Host 12 and is implemented as a hash table, which are well understood by those of ordinary skill in the art.

A Query 102 essentially broadcasts a selected feature $F_k$ 96 to all PEs 20($i$) which contain a TDBR 82 in the processes residing in their associated MEMs 24($i$). A microinstruction sequence concurrently provided from Sequencer 30 operating under direction of HOST 12, as described above, directs the PEs 20($i$) to compare the broadcast feature $F_k$ 96 with the features $F_{tj}$ residing in the TDBRs 82 and to generate a corresponding output depending upon the outcome of the comparison.

The response generated by each PE 20($i$) will depend upon whether the TDBR 82 associated with the PE 20($i$) contains a feature $F_{tj}$ which matches with the broadcast feature $F_k$, and whether the comparison process is to utilize per-T weights or cross-T weights.

In the event that the classification task is to use per-T weighting, each PE 20($i$) having an associated TBD 80 which contains a feature $f_{tj}$ which matches the feature $F_k$ will respond to the discovery of the match by reading from the Entry 86 containing the feature $F_{tj}$ matching the broadcast feature $f_k$ the per-T weight corresponding to the matching feature $F_{tj}$.

In the event that the classification task is to use cross-T weighting, Query 102 will again broadcast the selected feature $F_k$ to all PEs 20($i$) and each PE 20($i$) would associated TDBR 82 contains a feature $F_{tj}$ matching the broadcast feature $F_k$ will generate an output indicating a match. Unlike in the case of per-T weights, Query 102 will, when broadcasting the feature $F_k$ to the PEs 20($i$), index Cross-T 92 with the feature $F_k$ and will read from Cross-T 92 and broadcast to all PEs 20(i) the cross-T weight corresponding to that feature $F_k$.

In either event, therefore, a query of TDB 80 with a feature $F_k$ 96 from a New Sample 94 will result in each PE 20(i) whose associated TDBR 82 contains a feature $F_{tj}$ matching the broadcast feature $F_k$ receiving a probability weight for the match, wherein the probability weight is either a per-T weight read from the TDBR 82 or a cross-T weight provided from Cross-T 92. This operation is repeated for each feature $F_k$ 96 of the New Sample 94, and probability weights will be read to the PEs 20(i) according to the matches found between the features $F_{tj}$ of the TDBR 82 and the features $F_k$ of the New Sample 94.

The PEs 20(i) will receive the per-T and cross-T probability weights as TDB 80 is queried with each feature $F_j$ from New Sample 94 and, operating under control of Sequencer 30 and HOST 12, execute a selected evidence accumulation metric for each TDBR 82, such as the SUM, MAX or ERROR metric, to determine a cumulative match score representing the probability that the target value $t_j$ of each the TDBRs 82 is the correct target value $t_?$ for the New Sample 94. This operation is represented in FIG. 5 as Metric Operation 102 (Op 102).

To briefly summarize the metric operations, the SUM metric generates, for each TDBR 80, the accumulated sum of the probability weights for all features $F_{tj}$ of the TDBR 80 which match a feature $F_k$ of the New Sample 94, while the MAX metric determines the highest value probability weight of all of the features $F_{tj}$ of the TDBR 80 which match a feature $F_k$ of the New Sample 94. The Error metric generates for each TDBR 80, and for each match between a feature $F_{tj}$ of the TDBR 80 and a feature $F_k$ of the New Sample 94, the probability of error $P_e(T/F) = [1 - P(T/F)]$ arising from the match, and generates the cumulative product of error $P_{eT}$ over all matches between the TDBR 80 and the New Sample 94. Finally, the ERROR metric generates a number representing the likelihood of a correct match between the New Sample 94 and the TDBR 80 as $1 - P_{eT}$.

While a given implementation of System 10 may execute only a single metric operation, System 10 may also, as in the present example, be capable of selectively executing several different metric operations. As in the present example, the metric operation to be executed would be selected by software control from HOST 12 according to the data being operated upon, as has been discussed, and will be executed under control of microinstruction sequences from Sequencer 30 operating under control of programs executing on HOST 12.

The results generated by the selected metric operation during successive querying of TDB 80 by each of the New Sample 94 features $F_k$ are accumulated in a set of Metric Accumulation Registers (MA) 104. Each MA 104 is associated with a particular PE 20(i) and thus with a given TDBR 82 and preferably and usually resides in the MEM 24(i) of the associated PE 20(i).

After all features $F_k$ 96 of a New Sample 94 have been used to query the TDBRs 82 of TDB 80 and the PEs 20(i) have completed execution of the selected metric operation, the PEs 20(i), again operating under control of HOST 12 and Sequencer 30, will examine the results of the metric operation for each TDBR 82, as represented by the results stored in the corresponding MAs 104. System 10 will then select the TDBR 82 whose metric comparison score indicates the best match to the New Sample 94, and the target field value $t_j$ will be selected as the target field value of the New Sample 94.

This selection process is indicated in FIG. 5 as Select Score Operation 106 (Op 106) and Threshold Operation 108 (Op 108). In Op 106, System 10 selects the accumulated score most probably representing the correct match between a TDBR 82 and New Sample 94 according to the metric executed. In the event of the SUM, MAX and ERROR metrics, this involves selecting the highest accumulated score from the accumulated scores stored in MAs 104. In the case of the SUM metric, this score will represent the highest accumulated sum of the probability weights for all features $F_{jk}$ of a TDBR 82 which matched the features $F_k$ of the New Sample 94. In the case of the MAX metric, the TDBR 82 selected will be that having will be the highest value probability weight of all of the features $F_{tj}$ of the TDBR 80 which match the features $F_k$ of the New Sample 94. For the Error metric, the TDBR 82 selected will be that having the lowest cumulative product of error $P_{eT}$ over all matches between the TDBR 80 and the New Sample 94 or, expressed alternately, the highest probability of a correct match as represented by $1 - P_{eT}$.

If System 10 is using the k nearest neighbors method to determine the most probably correct match between a New Sample 94 and a TDBR 82, System 10 will select the k accumulated match scores having the highest comparison scores, without regard to the target field values of the selected TDBRs 82. The k best matches are then aggregated by their target field values and the target field value of the TDBRs 82 having the highest aggregate used as the target field value for the new sample.

Lastly, and if System 10 is executing threshold checks on the results of the above operations, Op 108 will compare the comparison score of the selected TDBR 82 to the selected threshold, as has been discussed, and will either approve the selection of the target field value of the selected TDBR 82 as the target field value of the New Sample 94 if the threshold value is met or exceeded, or reject the selection of the target field value and refer the New Sample 94 for decision by a human expert if the threshold is not met.

It will be understood by those of ordinary skill in the art after reference to Section A, Description of a Data Parallel System, and the accompanying FIGS. 1, 2 and 3, that the majority of the above operations will be performed in PPA 18, but that certain of the functions performed in Select Score Operation 106 and Threshold Operation 108 will be advantageously performed by Host 12 and GCU 28, or Host 12 and GCU 28 operating in conjunction with PPA 18, such as calculating the aggregate match scores and ratios of aggregate match score in the k nearest neighbors method. As has been described, all operations which may be performed on a number of data elements in parallel will be performed in PPA 18 operating under control of Host 12 and Sequencer 30 while operations involving a relatively small number of data elements will generally be performed by Host 12, often using the global result, combine and sum capabilities of GCU 28.

3. Classification of Natural Language Data On A Data Parallel System (FIGS. 6A-6B, 7A, 7B and 7C)

While the methods described above for constructing a training database and classifying natural language data may be practiced on a conventional sequential computer system, even if preferably practiced on a data parallel system as described herein, the following will describe two methods for classifying natural language data which are particularly adapted to and take advantage of the features of a data parallel system as described herein. The first method minimizes the size of the training database by storing only the features and target values of the training database records and by generating the per target and cross target probability weights "on the fly" as new samples are classified. The second method requires a larger training database in that the database stores not only all features of the training database records but also pre-generated per target and cross target probability weights, but provides faster classification of new samples.

a. The "On-The-Fly" Method (FIG. 6)

Figure 6A:
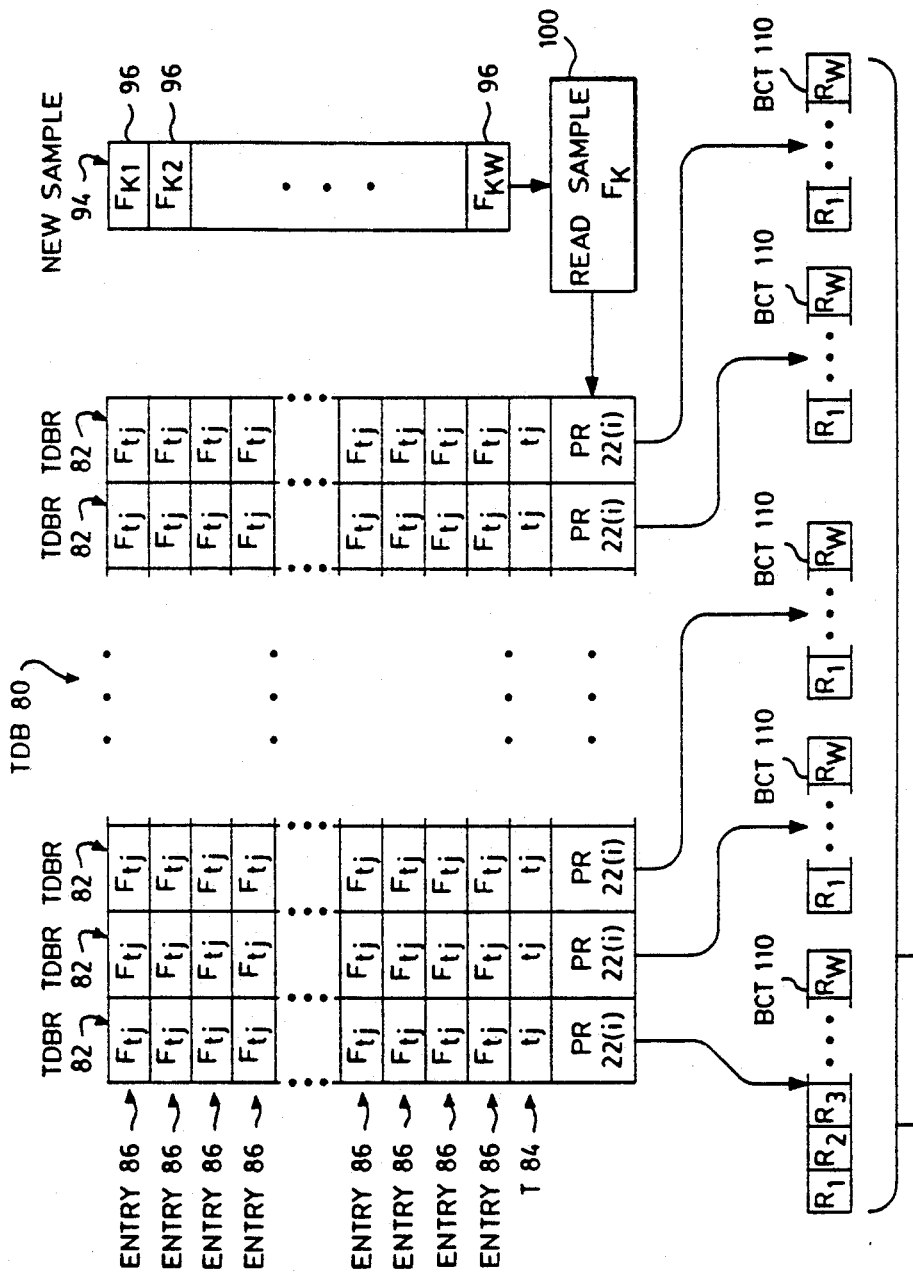
FIGS. 6A-6B is a representation of an on-the-fly method for classification of records containing natural language data according to the present invention; and, FIGS. 7A, 7B and 7C are a representation of a pre-generated probability weight tables method for classification of records containing natural language data according to the present invention.
Figure 6B:
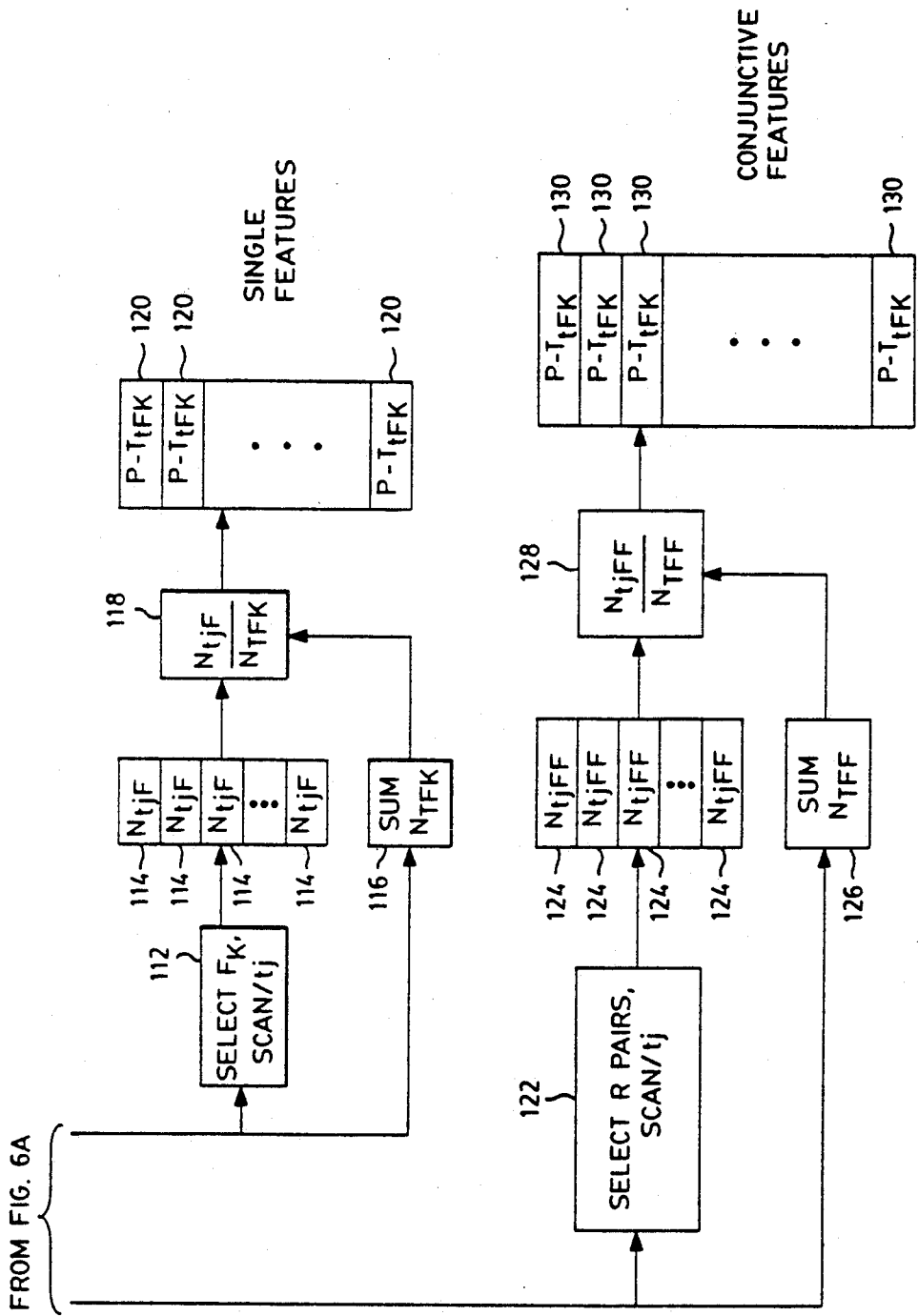

The first method, classification "on the fly", is illustrated in FIGS. 6A-6B wherein TDB 80 is again shown as comprised of a plurality of TDBRs 82 with each TDBR 82 being in turn comprised of a Target Value Field (T) 84 containing the target value $t_j$ of the record and a plurality of Entries 86 wherein each Entry 86 is comprised of only a corresponding feature $F_{tj}$.

Each TDBR 82 resides in a virtual process in the MEM 24(i) space of a corresponding PE 20(i), so that each TDBR 82 has associate with it a PR 22(i). For reasons which will become apparent from the following descriptions of the process, it is preferable that the TDBRs 82 be ordered across the PEs 20(i) of System 10 so that TDBRs 82 having like target values $t_j$ are grouped. As was described previously, if a TDBR 82 exceeds the MEM 24(i) space of a PE 20(i), the TDBR 82 may be divided among the MEM 24(i)s of two or more PEs 20(i), and the PRs 22(i) of the PEs 20(i) will operate in conjunction on the TDBR 82.

New Sample 94 is again comprised of the features $F_K$ 96 of the new sample, represented in FIGS. 6A-6B as $F_{K1}$ through $F_{K2}$, and the features $F_K$ 96 are read from New Sample 94 and broadcast to the PRs 22(i) by Read Sample $F_K$ 100 during the classification process. Each PR 22(i) compares each of the broadcast $F_K$s 96 to the features $F_{tj}$ residing in its associated TDBR 82, keyed by source category if source categories are used in the training database, and, for each broadcast feature $F_K$, provides a yes/no binary output, logical 1 or 0, indicating whether the associated TDBR 82 contains a feature $F_{tj}$ matching the broadcast feature $F_K$.

During the comparison of broadcast features $F_K$ to training database record features $F_{tj}$, each PR 22(i) constructs a Boolean Comparison Table (BCT) 110, in a virtual process, for its corresponding TDBR 82. As represented in FIGS. 6A-6B, each BCT 110 contains a plurality of entries R wherein each entry R corresponds to a broadcast feature $F_K$ and represents the results of the comparison between a broadcast feature $F_K$ and the features $F_{tj}$ of the corresponding TDBR 82, each R being, for example, a logic 1 if a match was found and a logic 0 if a match was not found. The $R_1$ of each BCT 110 thereby indicates whether there was a match found between New Sample feature $F_{K1}$ and a feature of the corresponding TDBR 82, the $R_2$ of each BCT 110 whether there was a match found between New Sample feature $F_{K2}$ and a feature of the corresponding TDBR 82, and so on.

Having compared all New Sample features $F_K$ to the features $F_{tj}$ of the TDBRs 82 and constructed a BCT 110 for each TDBR 82, with each BCT 110 containing a comparison result for each of features $F_K$, System 10 will then determine the per-T and cross-T weights for each feature $F_K$.

To determine the single feature per-T weights, System 10 will, in Operation 112, select in turn each $F_K$, and for each feature $F_K$, will scan the corresponding result entries of the BCTs 110 and determine, for each target value $t_j$, the number of occurrences, $N_{tjF}$ 114, of a match between the feature $F_K$ and a feature $F_{tj}$ of the corresponding TDBR 82 or TDBRs 82 having the target value $t_j$. In the System 10 of the present example, such as a Thinking Machines Corporation Model CM-2 system, this operation is performed as a "segmented scan", that is, a scan across a selected set of PEs 20(i). In this instance, each segmented scan will be across a group of PEs 20(i) containing TDBRs 82 having a like target value $t_j$ and it is to facilitate segmented scanning that the TDBRs 82 are grouped by target value.

Having determined the number of occurrences $N_{tjF}$ 114 of $F_K$ for each target value $t_j$, System 10 will, for each $F_K$, determine the total number of occurrences, $N_{TFK}$ 116, of $F_K$ over all values of $t_j$, that is, over all TDBRs 82 of TDB 80. In the exemplary System 10, this operation may be performed, as has been previously described, by a global sum operation. System 10 will then divide each $N_{tjF}$ 114 by $N_{TFK}$ 116 in Operation 118 to determine the per-T probability weight, P-$T_{tFK}$ 120, for each corresponding feature $F_K$.

System 10 will determine the probability weights of conjunctive features in a similar manner, but, assuming that the system is searching for two element conjunctions, will, in Operation 122 perform a logical AND operation on each possible pair of result entries R in the BCTs 110 when executing segmented scans of BCTs 110 to identify those BCTs 110 which contain positive comparison results in the two R entries corresponding to the two features of each pair of features, each such pair of features representing a conjunctive feature. System 10 will again determine, for each target value $t_j$, the number of occurrences, $N_{tjFF}$ 124, of each conjunctive feature for target value $t_j$. System 10 will also, for each conjunctive feature, perform a global sum operation to determine the total number of occurrences, $N_{TFKK}$ 126, of the conjunctive feature over all values of $t_j$, and will divide each $N_{tjFF}$ 124 by $N_{TFKK}$ 126 in Operation 128 to determine the probability weight P-$T_{tFK}$ 130 of each conjunctive feature.

In order to determine the cross-T weight of each feature, System 10 will perform the same operations as described above to determine the per-T weights of the features, but will then calculate the square of each per-T weight so determined. System 10 will then, for each feature, calculate the sum of the squared per-T weights for the feature over all target values, the sum of the squares of the per-T weights over all target values being the cross-T probability weight of the feature.

The per-T and cross-T probability weights determined according to the processes described above may then be used according to the previously described metrics to determine the TDBR 82, or nearest neighbor TDBRs 82, most matching New Sample 94.

It should be noted that, each cross-T probability weight is thereby determined for a $F_K$ which matches or is identical to a corresponding $f_{tj}$, and the probability weight found for a $F_K$ equally relates to the corresponding $f_{tj}$ which matches the $F_K$. That is, the probability weights relate to matches between training database features and new sample features and, since there is a one to one relationship between matching training database features and new sample features, the probability weights may be regarded as attaching equally to either the features $t_{tj}$ or the features $F_K$ for the purpose of performing the previously described metrics.

b. The Pre-generated Weights Method (FIGS. 7A, 7B and 7C)

As was described above, the second method substantially increases the size of the training database, but offers a significant increase in speed over the "on the fly" method for classifying new samples. In this method, which is illustrated in FIGS. 7A, 7B and 7C and referred to herein as the "pre-generated weights" method, System 10 first generates, for each training database record, all possible n-way conjunctions of the record's features, n being equal to two in the examples described herein, determines the probability weights for the conjunctive features, and stores the weights in a set of probability weight tables which are subsequently used in the classification of new samples. This pre-generated method is thereby performed in two steps, the first being the generation of the probability weight tables, and the second being the subsequent use of the probability weight tables to classify new samples.

Figures 7A, 7B:
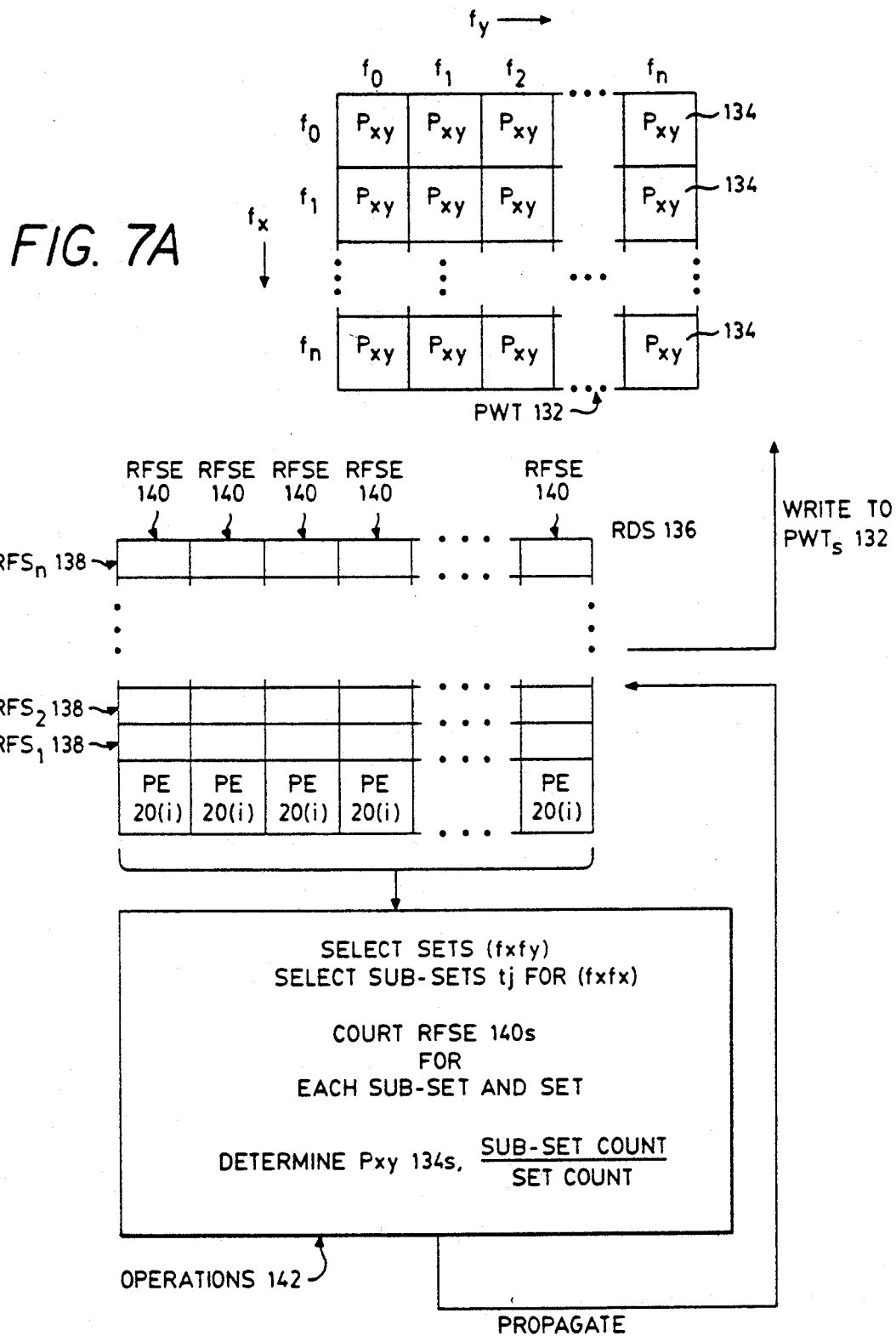
Figure 7C:
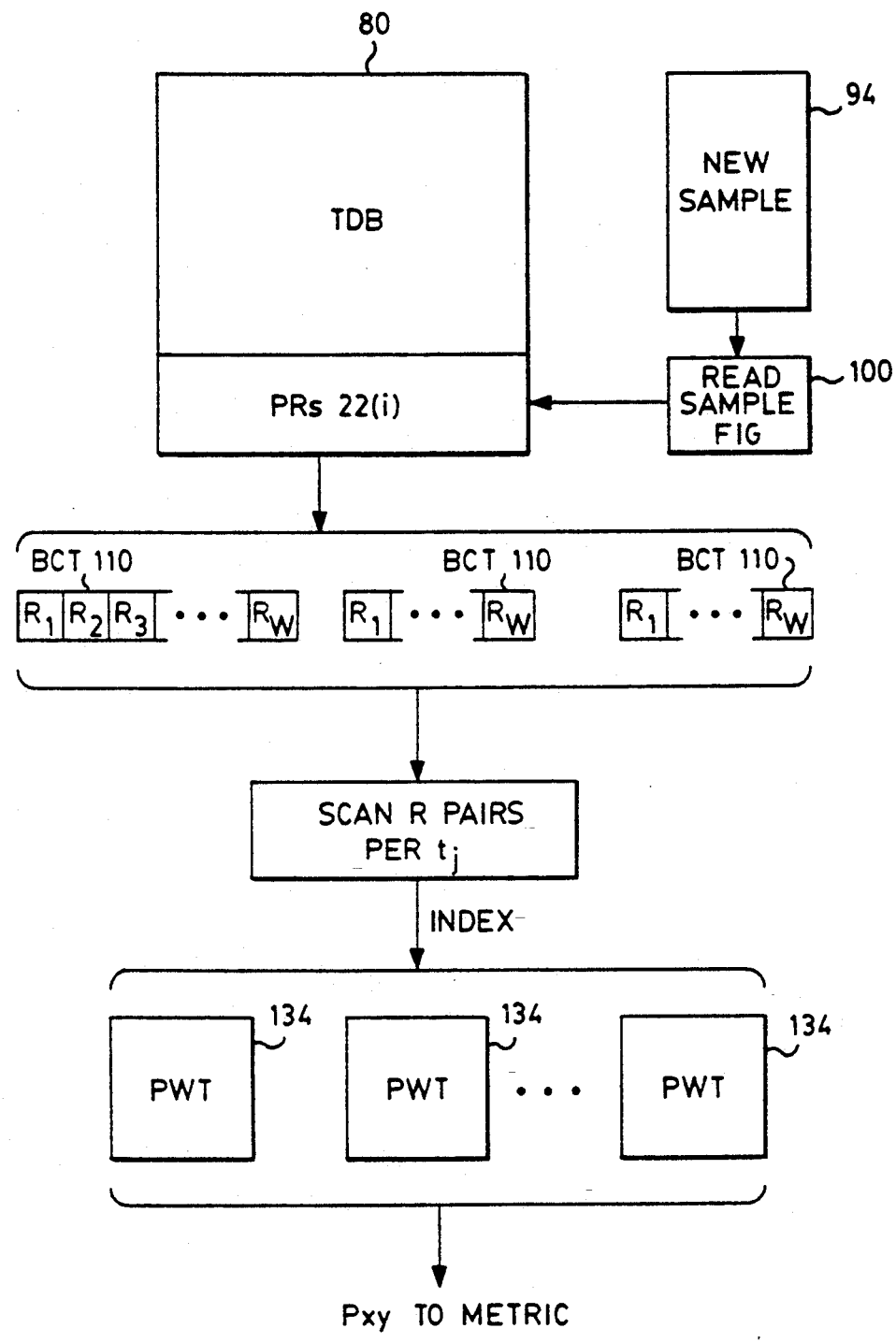

In the first step of the pre-generated method, determining the probability weights of the features of the training database, System 10 first determines all possible conjunctions of the features of the training database by generating a Probability Weight Table (PWT) 132, as illustrated in FIG. 7A, for each TDBR 82 wherein each PCT 132 is to contain the probability weights, $P_{xy}$ 134, for each possible conjunction of two features, fx and fy, of the corresponding TDBR 82. As is apparent from PWT 132, single features, that is, features which are not conjunctions of two or more features, are represented in the table as the conjunction of a feature with itself, and the probability weight of a feature conjuncted with itself is, of course, the feature's probability weight as a single feature. Such "single feature" conjunctions appear in the upper left and lower right corners of the table illustrated in FIG. 7A, that is, for the "single feature" conjunctions of $f_O,f_O$ and $f_n,f_n$, and for every pair of features along the diagonal connecting the two corners.

It should be noted that since each PWT 132 is symmetric, only one half of each PWT 132 need actually be stored in System 10. Also, while the following discussion will illustrate the present method assuming that all conjunctions are of two features, or words, the present method may equally well be used with n-way conjunctions, in which case each PWT 132 would become an n-dimensional table.

Having constructed a PWT 132 for each training database record, and having determined all possible conjunctions of features of the records, System 10 then stores the TDB 80 in the virtual processors of the PEs 20(i) as illustrated in FIG. 7B, and, from TDB 80, constructs a Record Data Structure (RDS) 136.

As represented in FIG. 7B, RDS 136 is comprised of a plurality of Record Feature Structures (RFSs) 138 and each RFS 138 is in turn comprised of a plurality of Record Feature Structure Entries (RFSEs) 140. Each RFS 138 corresponds to one of the TDBRs 82 of TDB 80 and contains, in each RFSE 140, either one of the features of the corresponding TDBR 82 or one of the possible conjunctions of the features of the corresponding TDBR 82.

Each RFSE 140 of a RFS 138 is stored in a different virtual processor of PPA 18. The RFSEs 140 of each RFS 138 are sorted according to keys comprised of the concatenation the three values, fx, fy, and $t_j$, in that order, of each of the RFSEs 140, wherein fx and fy occupy the most significant bits of each key and $t_j$ the least significant bits of the key, and are ordered across the virtual processors of PPA 18 according to the values of their keys.

System 10 then selects sets of RFSEs 140 having a common value for the fx,fy portions of their keys and then, within each such set, identifies each sub-set of RFSEs 140 having a common value of $t_j$. Then, for each such sub-set of RFSEs 140, each sub-set of RFSEs 140 comprising the RFSEs 140 having a common value of key (fx,fy,$t_j$), System 10 counts the number of RFSEs 140 in the sub-set and, for each set of RFSEs 140 having a common value for the fx,fy portions of their keys, counts the number of RFSEs 140 in the set. Then, for each sub-set, System 10 divides the number of RFSEs 140 in the sub-set by the number of RFSEs 140 in the set to which the sub-set belongs and propagates the results of these division operations to the corresponding RFSEs 140 as the per-T probability weights $P_{xy}$ 134 of the corresponding RFSEs 140. These operations, indicated in FIG. 7B as Operations 142, are accomplished in parallel across RDS 136 by segmented scan operations, wherein the segments correspond to the set and sub-sets of RFSEs 140.

The conjunctive feature probability weights $P_{xy}$ 134 are then written into the appropriate entries of the corresponding PWTs 132, and the PWTs 132 are ready for subsequent use in classifying new samples.

The classification of a New Sample 94 is illustrated in FIG. 7C and is generally similar, in its initial steps, to the steps of the "on the fly" method for identifying matching features between a New Sample 94 and the features contained in the TDBRs 82 of the TDB 80.

TDB 80 is again shown as comprised of a plurality of TDBRs 82 with each TDBR 82 being in turn comprised of a Target Value Field (T) 84 containing the target value $t_j$ of the record and a plurality of Entries 86 wherein each Entry 86 is comprised of only a corresponding feature $F_{tj}$. Each TDBR 82 resides in a virtual processor in a corresponding PE 20(i), so that each TDBR 82 has associate with it a PR 22(i).

New Sample 94 is again comprised of the features $F_K$ 96 of the new sample, represented in FIG. 7C as $F_{K1}$ through $F_{K2}$, and the features $F_K$ 96 are read from New Sample 94 and broadcast to the PRs 22(i) by Read Sample $F_K$ 100 during the classification process. Each PR 22(i) compares each of the broadcast $F_K$s 96 to the features $F_{tj}$ residing in its associated TDBR 82, keyed by source category if source categories are used in the training database, and, for each broadcast feature $F_K$, provides a yes/no binary output, logical 1 or 0, indicating whether the associated TDBR 82 contains a feature $F_{tj}$ matching the broadcast feature $F_K$.

During the comparison of broadcast features $F_K$ to training database record features $F_{tj}$, each PR 22(i) constructs a Boolean Comparison Table (BCT) 110, in a virtual processor, for its corresponding TDBR 82. As represented in FIG. 7C, each BCT 110 contains a plurality of entries R wherein each entry R corresponds to a feature in the corresponding Entry 86 of the corresponding TDBR 82 and represents the results of the comparison between a broadcast feature $F_K$ and the features $F_{tj}$ of the corresponding TDBR 82, each R being, for example, a logic 1 if a match was found and a logic 0 if a match was not found. The $R_1$ of each BCT 110 thereby indicates whether there was a match found between New Sample feature $F_{K1}$ and a feature of the corresponding TDBR 82, the R2 of each BCT 110 whether there was a match found between New Sample feature $F_{K2}$ and a feature of the corresponding TDBR 82, and so on.

System 10 will then perform a logical AND operation on each possible pair of result entries R in the BCTs 110 to identify those BCTs 110 which contain positive comparison results in the two R entries corresponding to the two features of each pair of features, each such pair of features representing, as described, a conjunctive feature.

The indices, that is, the fx,fy values, of the BCT 110 entries having entries R representing positive comparison results are then used as indices into the corresponding PWTs 132 to read from the PWTs 132 the probability weights $P_{xy}$ 134 corresponding to each Entry 86, that is, each conjunctive combination of features fx and fy, which matched a conjunctive combination of features $F_{xy}$ read from New Sample 94, and the probability weights $P_{xy}$ 134 read from the PWTs 132 are provided to the selected metric for use as previously described.

In summary, then, the "on the fly" method, while slower than the "pre-generated" method, reduces the memory requirements for the classification operation as the amount of data stored is substantially less than that stored in the "pre-generated" method, which may be significant when the training database is very large. It will also be noted that the "pre-generated" method, while requiring substantially greater memory space for storing the PWTs 132 during the classification operations, is relatively expensive in computer time in requiring a substantial computational process in generating the PWTs 132 before the classification operations may be performed. The generation of PWTs 132, however, need be performed only once for a given training database and the resulting PWTs 132 may be used repeatedly for subsequent classification operations. In addition, the "pre-generated" method is substantially faster than the "on the fly" method in performing the actual comparisons between a new sample and the training database examples.

Finally, the above discussion has presented a number of methods and paths by which new samples may be classified using the basic processes described above, such as either or both of per-T and cross-T probability weights, the SUM, MAX and ERROR metrics, and several methods for selecting the most probable match from the results of the metrics, such as k nearest neighbors and thresholds. Previous discussion have also stated that the particular combination of the above factors which provides the optimum results in achieving the goal of the system may often be dependent upon the characteristics of the data being operated upon, possibly the source category characteristics of the data, and upon the task the system is to accomplish. It has also been stated that the combination of methodologies which provides the optimum results for a particular case is generally not intuitively apparent from the data itself. For example, in the present example of classification of census returns, it was found that probability weighted feature metrics perform better than unweighted metrics in all instances, but that per-T weighting of conjunctive features using the ERROR metric performed best for classifying returns with regard to industry, but that cross-T weighting of single field features using the SUM metric and k nearest neighbors performed best for classifying returns with regard to occupation.

In the presently preferred implementations of the present invention, the optimum combination of probability weights, metrics and selection processes are determined empirically from the database of previously classified records. In this approach, the previously classified records are used to construct a training database as described above. A significant sample of the previously classified records are then selected, one at a time and in turn, and classified, using the training database with the selected record deleted from the training database, or inhibited from being used, and each of the various possible combinations of probability weight, metric and selection method. The results of the classifications using the various combinations of probability weights, metrics and selection methods are then compared to the original, previously classified records to determine which combination of factors yields the highest ratio of successfully and correctly classified records. That combination of factors is then used for that particular type of data and classification operation.

The above discussions have illustrated the present invention by describing an implementation of the present invention for the classification of natural language data in census returns, and has provided further examples by reference to use of the present invention for medical diagnosis from natural language data provided by patients. It will be well understood by those of ordinary skill in the art that the present invention may also be applied to other cases where it is necessary to classify, categorize or otherwise relate two or more bodies of data expressed in natural language terms.

For example, the present invention may be used to classify or compare literary works, extracting the features from a new work and comparing those features to the features of works already resident in a training database. The system could then classify the new work based upon matches between the features of the new work and the features of previously classified works. As has also been described above, for example, with reference to the k nearest neighbor method, the system could be used to perform or assist in literature searches by identifying the works in the training database which most closely match the new work. Also, the processes described above for analyzing historic record database examples to extract the information needed to determine probability weights yield, in themselves, very useful statistical information regarding the works in the historic records, such as number and frequency of occurrences of features (words) and combinations, or conjunctions, of features. Such processes have been described in particular with reference to FIGS. 4A–4B, 6A–6B and 7B. In yet another example, the present system may be used to classify patent applications by extracting the features of a newly filed patent application and comparing those features to the features of previously classified patents. In this instance, the resultant target value would, of course, be the Field of Art Classification of the new patent application. Again, the system could be used to assist in prior art searches by identifying previous issued patents or technical publications which most nearly match a new patent application.

The advantages of a system of the present invention are obvious given the descriptions and discussions herein. For example, systems of the present invention are much faster at classifying, categorizing, analyzing or otherwise relating two or more bodies of data expressed in natural language terms than are the systems of the prior art. In addition, systems are the present invention are much easier to construct and modify than are the systems of the prior art. Systems of the present invention also retain all of the data originally appearing in the original records, and perform matching or comparison operations based upon all the actual features and nway conjunctions of features of the original records that have predictive value, rather than operating on the basis or arbitrarily selected or imposed key words.

It is noted that the primary example discussed herein is optimized for operating with historic records of the question/answer form wherein the answers are in natural language terms. In addition to the census return and medical database examples, the processes and apparatus described herein could be used to evaluate the textual portions of insurance and credit reports and applications.

Therefore, while the invention has been particularly shown and described with reference to a preferred embodiment of the method thereof, it will be also understood by those of ordinary skill in the art that various changes, variations and modifications in form, details and implementation may be made therein without departing from the spirit and scope of the invention as defined by the appended claims.

Therefore, it is the object of the appended claims to cover all such variations and modifications as come within the true spirit and scope of the invention.

What is claimed and to be secured by Letters Patent of the United States is:

1. A system for classifying natural language data, comprising:
    means for storing a new record including a plurality of predictor data fields containing the natural language data expressed in natural language values,
    means for storing a plurality of training records, each training record including
        a plurality of predictor data fields, each predictor data field containing a feature, wherein each feature is a natural language term, and
        a target data field containing a target value representing a classification of a training record, and
        probability weight means for storing, for each feature, a probability weight value representing a probability that a new record will have the target value contained in the target data field if a feature contained in a corresponding predictor data field occurs in the new record,
    query means for extracting features from the new record and querying the training records with each feature extracted from the new record,
        the query means being responsive to a match between a feature extracted from the new record and a feature stored in said training record for providing the probability weight corresponding to the feature, and
    metric means for receiving the probability weights from the query means and accumulating for each training record a comparison score representing the probability that said training record matches the new record, and
    providing an output indicating said target field value of said training record as said target value of the new record.

2. The system of claim 1 for classifying records containing natural language data, wherein each probability weight value is a per-target value weight representing, for a corresponding single combination of a feature and a target field value, a conditional probability that the target field will have the target field value when the feature occurs among the features of the record containing the target field value.

3. The system of claim 2 for classifying natural language data, wherein the probability weight means includes:
    for each feature in each training record, a corresponding probability weight field associated with the predictor data field containing the feature, each probability weight field containing a per-target probability weight value for the feature contained in the associated predictor data field.

4. The system of claim 1 for classifying natural language data, wherein each probability weight value is a cross-target value weight representing, for a given corresponding feature, a relative conditional probability that the corresponding feature is of significance in determining target field values across all target field values of the training records.

5. The system of claim 4 for classifying natural language data, wherein the probability weight means further includes:
    for each feature, a probability weight field for containing the cross-target probability weight value for the feature.

6. The system of claim 4 for classifying natural language data, wherein a per-target value of a feature is a conditional probability that a target field will have a target field value given that the feature occurs among the features of the record containing the target field value and wherein each cross-target value weight is the sum of the squares of the per-target value weights for the corresponding feature.

7. The system of claim 1 for classifying natural language data, wherein natural language data is characterized by data values having an open-ended range of possible values.

8. The system of claim 1 for classifying natural language data, wherein natural language data is characterized in that the natural language data values do not have a relative order or ranking.

9. The system of claim 1 for classifying natural language data, wherein features further comprise conjunctions of natural language terms.

10. The system of claim 1 for classifying natural language data, wherein features comprise words and conjunctions of pairs of words.

11. The system of claim 1 for classifying natural language data, wherein:
    each feature is a member of one of a plurality of category subsets of features, and
    a feature appearing in identical form a multiplicity of the category subsets comprises a corresponding multiplicity of separate and distinct features.

12. The system of claim 1 for classifying natural language data, wherein the accumulated comparison score for each training record is the sum of the probability weights of the features in the new record which match features in the training record.

13. The system of claim 1 for classifying natural language data, wherein the accumulated comparison score for each training record is the highest probability weight of all the probability weights of all features in the new record that match features in the training record.

14. The system of claim 1 for classifying natural language data, wherein the accumulated comparison score for each training record is a cumulative probability of error in predicting the target value of the new record target field over all features of the new record which matched features of the training record.

15. The system of claim 1 for classifying natural language data, wherein the metric means further comprises means for selecting from the training records a subset of the training records having the highest comparison scores, without regard to the target field values of the selected training records, aggregating the selected training records by their target field values, and selecting the target field value of the training records having the highest aggregate match score as the target field value for the new record.

16. The system of claim 15 for classifying natural language data, wherein the metric means further comprises means for determining a confidence score for the selected target field value as the ratio of the aggregate match score of the training records having the highest aggregate match score to the sum of the aggregate match scores of the training records having the highest aggregate match score and the second highest aggregate match score.

17. In a data parallel system, means for classifying natural language data, comprising:
a plurality of processing elements for storing a corresponding plurality of training records, each training record residing in a process in a memory associated with the corresponding processor element and including
a plurality of predictor data fields, each predictor data field containing a feature, wherein each feature is a natural language term, and
a target data field containing a target value representing a classification of a training record,
a probability weight means for storing, for each feature, a probability weight value representing a probability that a new record will have said target value contained in the target data field if a feature contained in a corresponding predictor data field occurs in the new record,
a query means for extracting features from the new record and querying the training records with each feature extracted from the new record, including
a control means for storing the new record, extracting the features from the new record and transmitting the features to the processing elements, and
the processing elements for reading the features from each associated training record and responsive to a match between a feature extracted from the new record and a feature stored in said training record for reading the probability weight corresponding to the feature, and
a metric means for receiving the probability weights from the query means and accumulating for each training record a comparison score representing the probability that the training record matches the new record and providing an output indicating said training record most probably matching the new record, including
the processing elements for receiving the probability weights, each processor being responsive to instructions from the control means for accumulating for each corresponding training record a comparison score representing the probability that the training record matches the new record, and
a global combining means for providing an output indicating a training record most probability matching the new record.

18. A system for generating training records for use in classifying natural language data, comprising:
means for storing a plurality of historic records,
each historic record including
a target data field containing a target value representing a classification of a historic record, and
a plurality of predictor data fields, each predictor data field containing a natural language term, and
means for storing a plurality of training records,
each training record including
a plurality of predictor data fields, each predictor data field containing a feature, wherein each feature is a natural language term, and
said target data field containing said target value representing a classification of a training record, and
a probability weight memory for storing, for each feature,
a probability weight value representing a probability that a new record will have the target value contained in the target data field if said feature contained in a corresponding predictor data field occurs in the new record,
means for reading the natural language terms from each of the historic records and identifying each feature appearing in the historic records,
probability weight generating means for
selecting in turn each feature identified from the historic records, and
for each feature, selecting in turn each historic record target value for which the feature appears,
determining, for each historic record target value for each feature a probability weight, and
generating, for each historic record, a corresponding training record and
storing in the predictor data fields of the training record the features identified from the corresponding historic record, and
in the target data field of the training record the target value from the historic record, and
storing the probability weight generated for the feature and target in the probability weight memory.

19. In a data parallel system, means for generating training records for use in classifying natural language data, comprising:
a first plurality of processing elements for storing a corresponding plurality of historic records,
each historic record residing in a process in a memory of a corresponding processor element and including
a target data field containing a target value representing a classification of a historic record, and
a plurality of predictor data fields, each predictor data field containing a natural language term, and
a second plurality of processing elements for storing a corresponding plurality of training records, each training record residing in said process in said memory of a corresponding processor element and including a plurality of predictor data fields, each predictor data field containing a feature, wherein each feature is a natural language term, and a target data field containing a target value representing a classification of a training record, a probability weight memory for storing, for each feature, a probability weight value representing a probability that a new record will have the target value contained in the target data field if said feature contained in a corresponding predictor data field occurs in the new record, a query means including a control means and the processing elements for reading the natural language terms from each of the historic records and identifying each feature appearing in the historic records, a probability weight generating means including the control means and the processing elements for selecting in turn each feature identified from the historic records, and for each feature, selecting in turn each historic record target value for which the feature appears, and, a global combining means for determining, for each historic record target value and for each feature a probability weight value representing the probability that a record will have the target value contained in the target data field if said feature contained in a corresponding predictor data field occurs in the record, and storing in the predictor data fields of each training record the features identified from the corresponding historic record, and in the target data fields of the corresponding training record the target value from the historic record, and storing the probability weight generated for the feature and target value in a probability weight memory.

20. In a data parallel system, means for classifying natural language data, comprising:

a plurality of processing elements for storing a corresponding plurality of training records, each training record including a plurality of predictor data fields, each predictor data field containing a feature, wherein each feature is a natural language term, and a target data field containing a target value representing a classification of a training record, control means for storing a new record containing features comprised of the natural language data, and for broadcasting the features of the new record to the processing elements storing the training records, each processing element being responsive to the broadcast features of the new record to construct, in a process associated with each training data record, a boolean comparison table for storing indications of matches between the broadcast new record features and the features of the corresponding training record, scanning means for reading the indications of matches in each boolean comparison table and determining, for each broadcast feature of the new record and each target value of the training records, number of indications of matches between the broadcast feature and the features of the training record for each target value, and number of indications of matches between the broadcast feature and the features of the training record over all target values, and for determining, for each broadcast feature and each target value, a probability weight representing a probability that the new sample will have the target value of the record if the new sample feature appears in the record.

21. The means for classifying natural language data of claim 20, further comprising:

a metric means responsive to each probability weight corresponding to a feature of the new sample for determining the training record most probably matching the new record.

22. The means for classifying natural language data of claim 20, wherein the scanning means further comprises:

means for performing logical AND operations on each possible combination of the match indications in each boolean comparison table, each AND operation representing a conjunctive feature, and determining, for each conjunctive feature and each target value of the training records, the number of matches between each conjunctive feature and the features of the training record for each target value, and the number of matches between the conjunctive feature and the features of the training record over all target values, and for determining, for each broadcast feature and each target value, a probability weight representing the probability that the new sample will have the target value of the record if the conjunctive feature appears in the record.

23. The means for classifying natural language data of claim 20, wherein the probability weights determined over each target value are per target probability weights and the scanning means further comprises:

means for determining, for each feature, the square of each per target probability weight of the feature for all target values, and determining the cross target probability weight for each feature by summing the squares of the per target probability weights of the feature over all target values.

24. In a data parallel system, means for constructing probability weight tables for storing probability weights of a plurality of features of each of a plurality of training records for use in classifying natural language data, wherein each training record includes a plurality of predictor data fields, each predictor data field containing a feature wherein each feature is a natural language term, and a target data field containing a target value representing a classification of a record, wherein a probability weight is a probability that a new sample of a record containing natural language data will have the target value of a training record if a feature of the training record appears in the new sample of the new sample, comprising:

a plurality of processors for storing a corresponding plurality of record feature structures, each record feature structure corresponding to said training record and including
- a plurality of record feature structure entries,
  - each record feature structure entry containing a feature or a possible conjunction of features of the corresponding training record, and wherein
  - the record feature structure entries of each record feature structure are sorted according to the values of the keys formed by a concatenation of the values of the features of each entry and the target value of the corresponding training record, a plurality of processors for storing a corresponding plurality of probability weight tables,
- each probability weight table corresponding to said training record and containing an entry for each possible conjunction of features of the training record,
  - a single feature of said training record being represented in the corresponding probability weight table as a conjunction of the single feature with itself, means for selecting sets of record feature structures, wherein each set of record feature structures have a common value for a feature portion of their keys, and selecting, within each set of register feature structures, a plurality of subsets of record feature structures, wherein the record feature structures of each subset of record feature structures have a common target field value, and
- wherein each subset of record feature structures corresponds to a feature of the record feature structure, means for determining, for each set of record feature structures,
- the number of record feature structures in the set of record feature structures, and
- for each subset of record feature structures in the set of register feature structures, the number of record feature structures in the subset, and
- for each subset in the set of record feature structures,
  - dividing the number of record feature structures in the subset by the number of record feature structures in the set of record feature structures to determine a conjunctive probability weight of the corresponding feature of the record feature structure, and
  - writing the conjunctive probability weight for each feature of each record feature structure into a corresponding entry of the probability weight table of the corresponding training record.

25. In a data parallel system including a means for storing a plurality of weight tables for storing probability weights of features of each of a plurality of training records, wherein a probability weight is a probability that a new sample of a record containing natural language data will have the target value of a training record if a feature of the training record appears in the new sample of the new sample, means for classifying new records containing natural language data, comprising:

a plurality of processors for storing a corresponding plurality of training records,
- each training record including
  - a plurality of predictor data fields, each predictor data field containing a feature, wherein each feature is a natural language term, and
  - a target data field containing a target value representing a classification of said training record, a plurality of processors for storing a corresponding plurality of probability weight tables,
- each probability weight table corresponding to said training record and containing an entry for each possible conjunction of features of the training record,
  - a single feature of said training record being represented in the corresponding probability weight table as a conjunction of the single feature with itself, a control means for storing a new record containing features comprised of natural language data, and for broadcasting the features of the new sample to the processors storing the training records,
- each processor being responsive to the broadcast features of the new sample to construct, in a process associated with each training data record, a boolean comparison table for storing indications of matches between the broadcast new sample features and the features of the corresponding training record, scanning means for performing logical AND operations on each combination of the match indications in each boolean comparison table to find conjunctive feature matches, wherein each AND operation represents a conjunctive feature, and,
- for each conjunctive feature match found in a boolean comparison table, using the values of the conjunctive features resulting in the match as indices into the probability weight table of the corresponding training record and reading from the probability weight table a conjunctive probability weight of the conjunctive feature.

26. The means for classifying natural language data of claim 25, further comprising:
a metric means responsive to each probability weight corresponding to a feature of the new sample for determining the training record most probably matching the new record.

27. In a data parallel system including a plurality of processing elements, each processing element including a memory for storing data and an associated processor to operate on the memory for performing operations on the data residing in the memory, and control means for issuing instructions for directing operations of the system, each processor being responsive to the instructions for performing the operations in parallel on the data stored in the associated memory, a method for classifying natural language data, comprising steps of:

storing a plurality of training records in a corresponding plurality of processor elements,
- each training record residing in a process in the memory of the processor element and including
  - a plurality of predictor data fields, each predictor data field containing a feature, wherein each feature is a natural language term, and
  - a target data field containing a target value representing a classification of training record, and storing in a probability weight memory, and for each feature, a probability weight value representing a probability that a new record will have the target value contained in the target data field if a feature contained in a corresponding predictor data field occurs in the new record, querying the training records with each feature extracted from a new record, by storing the new record in the control means and, by operation of the control means, extracting the features from a new record and transmitting the features to the processors of the processing elements, and in the processors of the processing elements, reading the features from the training records stored in each associated training record, and responsive to each match between a feature extracted from the new record and a feature stored in a training record, reading the probability weight corresponding to the feature, and accumulating, in the processing element for each corresponding training record and according to a selected metric, a comparison score representing the probability that said training record matches the new record and providing an output indicating said training record most probably matching the new record, and selecting the target field value of a training record as a target value of the new record.

28. A method for implementing in a data parallel system which includes a plurality of processing elements, each processing element including a memory for storing data and an associated processor to operate on the memory for performing operations on the data residing in the memory, a global combining means for performing operations on outputs of the processing elements, and control means for issuing instructions for directing operations of the system, each processor being responsive to the instructions for performing the operations in parallel on the data stored in the associated memory, said method for generating training records for use in classifying natural language data, comprising steps of:

storing in a first plurality of processing elements a corresponding plurality of historic records, each historic record residing in a process in the memory of a corresponding processor element and including a target data field containing a target value representing a classification of a historic record, and a plurality of predictor data fields, each predictor data field containing a natural language term, and storing in a second plurality of processing elements a corresponding plurality of training records, each training record residing in said process in the memory of a corresponding processor element and including a plurality of predictor data fields, each predictor data field containing said feature, wherein said each feature is a natural language term, and a target data field containing a target value representing a classification of a training record, and by operation of the control means and the processing elements, reading the natural language terms from each of the historic records and identifying each feature appearing in the historic records, generating a probability weight for said each feature, including by operation of the control means and the processing elements, selecting in turn said each feature identified from the historic records, and for said each feature, selecting in turn each historic record target value for which the feature appears, and, by operation of the global combining means, determining, for each historic record target value and for said each feature a probability weight value representing a probability that a record will have the target value contained in the target data field if said feature contained in a corresponding predictor data field occurs in the record, and storing in the predictor data fields of each training record the features identified from the corresponding historic record, and in the target data fields of the corresponding training record the target value from the historic record, and storing in a probability weight memory, for said each feature, a probability weight value generated for each feature and target value.

29. A method for implementing in a data parallel system which includes a plurality of processing elements, each processing element including a memory for storing data and an associated processor to operate on the memory for performing operations on the data residing in the memory, a global combining means for performing operations on outputs of the processing elements, and control means for issuing instructions for directing operations of the data parallel system, each processor of each processing element being responsive to the instructions for performing the operations in parallel on the data stored in the memory of the processing element, said method for classifying natural language data, comprising the steps of:

storing in the processing elements a plurality of training records, each training record including a plurality of predictor data fields, each predictor data field containing a feature, wherein each feature is a natural language term, and a target data field containing a target value representing a classification of a training record, storing a new record containing features comprised of the natural language data in the control means and, by operation of the control means, broadcasting the features of the new record to the processing elements storing the training records, in each processing element, and responsive to the broadcast features of the new record, constructing in a process associated with each training data record a boolean comparison table for storing indications of matches between the broadcast new record features and the features of the corresponding training record, in the processing elements, scanning each of the boolean comparison tables for indications of matches and determining, for each broadcast feature and each target value of the training records, a number of indications of matches between the broadcast feature and the features of the training record for each target value, and a number of indications of matches between the broadcast feature and the features of the training record over all target values, and determining, for each broadcast feature and each target value, a probability weight representing a probability that the new record will have the target value of a training record if a new sample feature appears in the training record.

30. The method for classifying natural language data of claim 29, further comprising the steps of:

accumulating according to a selected metric each probability weight corresponding to a feature of the new sample, and selecting a training record most probably matching the new record.

31. The method for classifying natural language data of claim 29, wherein the scanning steps further comprise the steps of:

scanning the boolean comparison tables with a logical AND operations on each possible combination of the match indications in each boolean comparison table, each AND operation representing a conjunctive feature, and determining, for each conjunctive feature and each target value of the training records, a number of indications of matches between each conjunctive feature and the features of the training record for each target value, and a number of indications of matches between the conjunctive feature and the features of the training record over all target values, and determining, for each broadcast feature and each target value, a probability weight representing a probability that the new sample will have the target value of a training record if the conjunctive feature appears in the training record.

32. The method for classifying natural language data of claim 29, wherein the probability weights determined over each target value are per target probability weights and the steps for determining probability weights further comprise the steps of:

determining, for said feature, a square of each per target probability weight of the feature for all target values, and determining the cross target probability weight for said feature by summing the squares of the per target probability weights of the feature over all target values.

33. In a data parallel system which includes a plurality of processing elements, each processing element including a memory for storing data and an associated processor to operate on the memory for performing operations on the data residing in the memory, a global combining means for performing operations on outputs of the processing elements, and control means for issuing instructions for directing operations of the data parallel system, each processor being responsive to the instructions for performing the operations in parallel on the data, stored in the associated memory, said method for constructing probability weight tables for storing probability weights of a plurality of features of each of a plurality of training records for use in classifying natural language data, wherein each training record includes a plurality of predictor data fields, each predictor data field containing a feature wherein each feature is a natural language term, and a target data field containing a target value representing a classification of a record, wherein a probability weight is a probability that a new sample of a record containing natural language data will have the target value of a training record if a feature of the training record appears in the new sample of the new sample, comprising the steps of:

storing in a first plurality of processors a corresponding plurality of record feature structures, each record feature structure corresponding to said training record and including a plurality of record feature structure entries, each record feature structure entry containing a feature or a possible conjunction of features of the corresponding training record, and wherein the record feature structure entries of each record feature structure are sorted according to the values of the keys formed by the concatenation of the values of the features of each entry and the target value of the corresponding training record, storing in a second plurality of processors a corresponding plurality of probability weight tables, each probability weight table corresponding to said training record and containing an entry for each possible conjunction of features of the training record, a single feature of said training record being represented in the corresponding probability weight table as a conjunction of the single feature, in the processors, selecting sets of record feature structures, wherein each set of record feature structures have a common value for a feature portion of their keys, and within each set of register feature structures, a plurality of subsets of record feature structures, wherein a record feature structure of each subset of record feature structures have a common target field value, and wherein each subset of record feature structures corresponds to a feature of the record feature structure, in the processors, determining, for each set of record feature structures, a number of record feature structures in the set of record feature structures, and for each subset of record feature structures in the set of register feature structures, the number of record feature structures in the subset, and for each subset in the set of record feature structures, dividing the number of record feature structures in the subset by the number of record feature structures in the set of record feature structures to determine a conjunctive probability weight of the corresponding feature of the record feature structure, and writing the conjunctive probability weight for each feature of each record feature structure into a corresponding entry of the probability weight table of the corresponding training record.

34. A method for implementing in a data parallel system which includes a plurality of processing elements, each processing element including a memory for storing data and an associated processor to operate on the memory for performing operations on the data residing in the memory, a global combining means for performing operations on outputs of the processing elements, and control means for issuing instructions for directing operations of the system, each processor of each processing element being responsive to the instructions for performing the operations in parallel on the data stored in the memory of the processing element, said method for classifying new records containing natural language data, comprising the steps of:

storing in a plurality of processors a corresponding plurality of training records,
each training record including
a plurality of predictor data fields, each predictor data field containing a feature, wherein said feature is a natural language term, and
a target data field containing a target value representing a classification of a training record,
storing in a plurality of processors a corresponding plurality of probability weight tables,
each probability weight table corresponding to said training record and containing a probability weight entry for each possible conjunction of features of the training record, wherein
a single feature of said training record is represented in the corresponding probability weight table as a conjunction of a single feature, and wherein
a probability weight is a probability that a new sample record containing natural language data will have the target value of said training record if said feature of the training record appears in the new record,
storing a new record containing features comprised of natural language data and broadcasting the features of the new sample to the processors storing the training records,
in each processor and responsive to the broadcast features of the new sample, constructing in a process associated with each training data record a boolean comparison table for storing indications of matches between the broadcast new sample features and the features of the corresponding training record,
in the processors, performing logical AND scanning operation on each combination of the indications of matches in each boolean comparison table to find conjunctive feature matches, wherein each AND operation represents a conjunctive feature, and,
for each indication of said conjunctive feature match found in a boolean comparison table, using the values of the conjunctive features resulting in the indication of said conjunctive feature match as indices into the probability weight table of the corresponding training record and reading from the probability weight table the conjunctive probability weight of the conjunctive feature.

35. The method for classifying natural language data of claim 34, further comprising the steps of:
accumulating the probability weights corresponding to a feature of the new sample according to a selected metric, and
determining the training record most probably matching the new record.

36. A system for classifying natural language data, comprising:
means for storing a new record including a plurality of predictor data fields containing the natural language data expressed in natural language values,
means for storing a plurality of training records,
each training record including
a plurality of predictor data fields, each predictor data field containing a feature, wherein
said feature is a natural language term,
said feature is a member of one of a plurality of category subsets of features, and
said feature appearing in identical form in a multiplicity of the category subsets comprises a corresponding multiplicity of separate and distinct features, and
a target data field containing a target value representing a classification of said training record, and
probability weight means for storing, for said feature, a probability weight value representing a probability that a new record will have the target value contained in the target data field if said feature contained in a corresponding predictor data field occurs in the new record,
query means for extracting features from the new record and querying the training records with said feature extracted from the new record,
the query means being responsive to a match between said feature extracted from the new record and said feature stored in a training record for providing the probability weight corresponding to the feature, and
metric means for receiving the probability weights from the query means and accumulating for said training record a comparison score representing the probability that said training record matches the new record, and
providing an output indicating a target field value of said training record as a target value of the new record.

37. A system for comparing a new data record to training data records, comprising:
means for storing a new record including a plurality of data fields containing new record data values,
means for storing a plurality of training records,
each training record including a plurality of data fields containing training record data values,
probability weight means for storing a probability weight for each training record data value,
each probability weight value representing a probability that a new record will have a match with said training record if a data value in a training record data field occurs in a new record data field, and
comparison means for
querying the training records with each data value of the new record,
accumulating for said training record a comparison score of the probability weights for each match between a new record data value and a training record data value, and
providing an output indicating a comparison score.

* * * * *